US009307214B1

(12) United States Patent
Liu et al.

(10) Patent No.: US 9,307,214 B1
(45) Date of Patent: *Apr. 5, 2016

(54) AUTOMATIC WHITE BALANCE METHODS AND SYSTEMS FOR ELECTRONIC CAMERAS

(71) Applicant: OmniVision Technologies, Inc., Santa Clara, CA (US)

(72) Inventors: Changmeng Liu, Sunnyvale, CA (US); Chengming Liu, San Jose, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/577,242

(22) Filed: Dec. 19, 2014

(51) Int. Cl.
H04N 9/73 (2006.01)
G06K 9/46 (2006.01)
G06T 7/40 (2006.01)

(52) U.S. Cl.
CPC .............. *H04N 9/735* (2013.01); *G06K 9/4652* (2013.01); *G06T 7/408* (2013.01)

(58) Field of Classification Search
CPC ..... H04N 9/735; H04N 1/6077; H04N 1/608; H04N 13/0025; H04N 9/3182; H04N 9/68; H04N 1/6086; H04N 9/73; H04N 9/045; H04N 1/407; H04N 5/2258; H04N 5/3572; G09G 2320/0666; H01L 27/14625; H01L 27/14627; G06K 9/4652
USPC ...................................................... 348/223.1
See application file for complete search history.

(56) References Cited

U.S. PATENT DOCUMENTS

| 7,570,881 | B2 * | 8/2009 | Perala | ..................... G03B 15/03 348/188 |
|---|---|---|---|---|
| 8,160,355 | B1 * | 4/2012 | Polonsky | ................ G06T 5/009 382/162 |
| 8,731,277 | B2 * | 5/2014 | Bai | ..................... H04N 13/0025 348/42 |
| 9,113,114 | B2 * | 8/2015 | Lee | ..................... H04N 5/2351 |
| 9,118,880 | B2 * | 8/2015 | Hong | ..................... H04N 9/735 |
| 2007/0146498 | A1 * | 6/2007 | Kim | ..................... H04N 9/73 348/223.1 |
| 2008/0111896 | A1 * | 5/2008 | Yoshino | ................. H04N 9/735 348/223.1 |
| 2009/0309995 | A1 * | 12/2009 | Xiong | .................... H04N 9/735 348/223.1 |
| 2010/0033595 | A1 * | 2/2010 | Ajito | ...................... H04N 9/735 348/223.1 |
| 2010/0245618 | A1 * | 9/2010 | Ajito | ...................... H04N 9/735 348/223.1 |
| 2013/0088623 | A1 * | 4/2013 | Ashida | ............... H04N 5/35563 348/294 |
| 2014/0168463 | A1 * | 6/2014 | Tamura | .................. H04N 9/735 348/223.1 |
| 2014/0240533 | A1 * | 8/2014 | Hirooka | ................. H04N 9/643 348/223.1 |
| 2015/0256760 | A1 * | 9/2015 | Ju | .......................... H04N 9/045 348/256 |
| 2015/0312540 | A1 * | 10/2015 | Tuna | ...................... H04N 9/735 348/223.1 |

* cited by examiner

*Primary Examiner* — Pritham Prabhakher
(74) *Attorney, Agent, or Firm* — Lathrop & Gage LLP

(57) ABSTRACT

A brightness-sensitive automatic white balance method includes (a) determining the brightness of a scene captured in an electronic color image, (b) selecting a color-weighting map based upon the brightness of the scene, (c) extracting auto white balance parameters from the color-weighting map, and (d) white balancing the electronic color image according to the auto white balance parameters. An adaptive automatic white balance method includes (a) refining, based upon a first electronic color image of a scene illuminated by an illuminant of a first spectral type, a color-weighting probability distribution for the illuminant of the first spectral type, wherein the color-weighting probability distribution may be brightness-specific, (b) extracting auto white balance parameters from the refined color-weighting probability distribution, and (c) white balancing, according to the auto white balance parameters, an electronic color image of a scene illuminated by the illuminant of the first spectral type.

18 Claims, 13 Drawing Sheets

600

OPTIONALLY PERFORM FOR ILLUMINANTS OF SAME OR DIFFERENT SPECTRAL TYPES AND/ OR FOR SAME OR DIFFERENT SCENE BRIGHTNESSES

CAPTURE ELECTRONIC COLOR IMAGE OF A SCENE ILLUMINATED (OPTIONALLY AT SPECIFIC BRIGHTNESS) BY AN ILLUMINANT OF A FIRST SPECTRAL TYPE
610

REFINE (OPTIONALLY BRIGHTNESS-SPECIFIC) COLOR-WEIGHTING MAP BASED UPON THE CAPTURED ELECTRONIC COLOR IMAGE
620

REFINE COLOR-WEIGHTING PROBABILITY DISTRIBUTION FOR THE ILLUMINANT OF THE FIRST SPECTRAL TYPE
625

EXTRACT AWB PARAMETERS FROM THE REFINED COLOR-WEIGHTING MAP
630

EXTRACT AWB PARAMETERS FROM THE REFINED COLOR-WEIGHTING PROBABILITY DISTRIBUTION
635

CORRECT, ACCORDING TO THE AWB PARAMETERS, COLOR OF AN ELECTRONIC COLOR IMAGE OF A SCENE ILLUMINATED (OPTIONALLY AT SPECIFIC BRIGHTNESS) BY AN ILLUMINANT OF THE FIRST SPECTRAL TYPE TO GENERATE A WHITE BALANCED IMAGE
640

FIG. 6 ered white by white balancing the initial output of an image sensor. Human eyes are very good at judging what is white under different light sources, but image sensors often have great difficulty doing so, and often create unsightly blue, orange or green color casts. Different illuminants, i.e., light sources, have their unique spectral characteristics. The spectral characteristics of a given illuminant may be represented by its color temperatures. The color temperature of a light source is the temperature of an ideal black body radiator that radiates light of comparable hue to the light source. The color temperature refers to the relative warmth or coolness of white light. As the color temperature rises, the light energy increases. Hence, the wavelengths of light emitted by the illuminant become shorter, i.e., shift towards the blue portion of the visible spectrum, and the color hue becomes cooler.

An image sensor capturing images of a scene illuminated by a given illuminant will initially produce images with colors affected by the color temperature of the illuminant. Therefore, many electronic cameras use automatic white balance (AWB) to correct for the color output of the image sensor according to the illuminant. In order to apply AWB, the electronic camera must have AWB parameters, often represented as gains to color channels, for each illuminant. The AWB unit of an electronic camera first determines which illuminant is being used to illuminate the scene. Next, the AWB unit applies the AWB parameters of that illuminant to the image of the scene to provide an image with a more true representation of the colors of the scene.

Typically, to produce a set of AWB parameters for an electronic camera, the electronic camera captures images of a gray object, such as a specially made gray card, under various color temperature illumination conditions representing the range of illuminants encountered in actual use. For example, images are captured under four different reference illuminants: a D65 light source which corresponds to noon daylight and has a color temperature of 6504 Kelvin, a cool white fluorescent (CWF) lamp with a color temperature of 4230 Kelvin, a TL84 fluorescent lamp with a color temperature of 4000 Kelvin, and light source A (incandescent tungsten) with a color temperature of 2856 Kelvin. Ideally, a manufacturer of electronic cameras with an AWB function should perform this calibration procedure for each electronic camera produced. However, such a practice is generally too expensive. A common practice in the image sensor industry is to calibrate one or a small number of electronic cameras, called the golden modules, under various illumination conditions, and then apply the resulting AWB parameter set to all other image sensors. However, sensor-by-sensor variation inherently exists due to variation in the spectral properties of, e.g., the spectral properties of the quantum efficiency, the color filter array, and the infrared-cut filter of the image sensor. As a result, using the golden module AWB parameter set for all other image sensors frequently leads to errors.

SUMMARY

In an embodiment, a brightness-sensitive automatic white balance method includes (a) determining the brightness of a scene captured in an electronic color image, (b) selecting a color-weighting map based upon the brightness of the scene, (c) extracting auto white balance parameters from the color-weighting map, and (d) correcting color of the electronic color image, according to the auto white balance parameters, to generate a white balanced image.

In an embodiment, a method for generating brightness-specific auto white balance parameters for an electronic color camera includes, for each of a plurality of brightnesses of an inherently gray scene, (a) determining the color distribution for an electronic color image, captured by the electronic color camera, of the inherently gray scene illuminated by an illuminant of a specific spectral type, and (b) generating a brightness-specific color-weighting probability distribution representing the color distribution.

In an embodiment, a system for brightness-sensitive automatic white balancing of an electronic color image captured by an electronic camera includes a processor and a memory. The memory includes (a) a plurality of brightness-specific color-weighting maps each specifying illuminant-specific auto white balance parameters, (b) a plurality of brightness range definitions respectively indicating applicability range of the plurality of brightness-specific color-weighting maps, and (c) machine-readable white balance instructions, encoded in a non-transitory portion of the memory, that, upon execution by the processor, white balances the electronic color image. The white balance instructions include brightness instructions that, upon execution by the processor, determine the brightness of a scene represented by the electronic color image and select one of the plurality of brightness-specific color-weighting maps based upon the plurality of brightness range definitions.

In an embodiment, an adaptive automatic white balance method includes (a) refining, based upon a first electronic color image of a scene illuminated by an illuminant of a first spectral type, a color-weighting probability distribution for the illuminant of the first spectral type, (b) after the step of refining, extracting auto white balance parameters from the color-weighting probability distribution, and (c) correcting, according to the auto white balance parameters, color of a second electronic color image of a scene illuminated by the illuminant of the first spectral type to generate a white balanced image.

In an embodiment, a system for adaptive automatic white balancing of an electronic color image captured by an electronic camera includes a processor and a memory. The memory includes a color-weighting map specifying a probability distribution of an ordered pair of color ratios. The ordered pair of color ratios define auto white balance parameters. The probability distribution is composed of a plurality of illuminant-specific probability distributions respectively associated with a plurality of different spectral types of illuminant. The memory further includes machine-readable white balance instructions encoded in a non-transitory portion of the memory. The white balance instructions include refinement instructions that, upon execution by the processor, process one or more electronic color images captured by the electronic camera to refine at least one of the plurality of illuminant-specific probability distributions.

BRIEF DESCRIPTION OF THE DRAWINGS

FIG. 6 illustrates an adaptive AWB method, according to an embodiment.

DETAILED DESCRIPTION OF THE EMBODIMENTS

Disclosed herein are automatic white balance methods and systems that provide improved AWB parameters for an electronic camera through brightness-specific AWB parameters and/or AWB parameters adaptive to illuminants associated with actual use of the electronic camera. A plurality of brightness-specific AWB parameter sets, respectively associated with scenes of different brightnesses, may better represent actual spectral characteristics of scene illumination than a single AWB parameter set intended to describe scenes of any brightness. AWB parameters that, during use of an electronic camera, adapt to the spectral properties of illuminants serve to customize the AWB parameters to better represent scenes captured by the electronic camera when in the hands of the user. Such adaptive AWB parameters, optionally brightness-specific, may also help correct inaccuracies in the initial calibration of the AWB parameters performed by the electronic camera manufacturer. Hence, use of adaptive AWB parameters may reduce calibration requirements and thereby manufacturing cost, which in turn may result in more affordable electronic camera offerings to the consumer.

Figure 1:
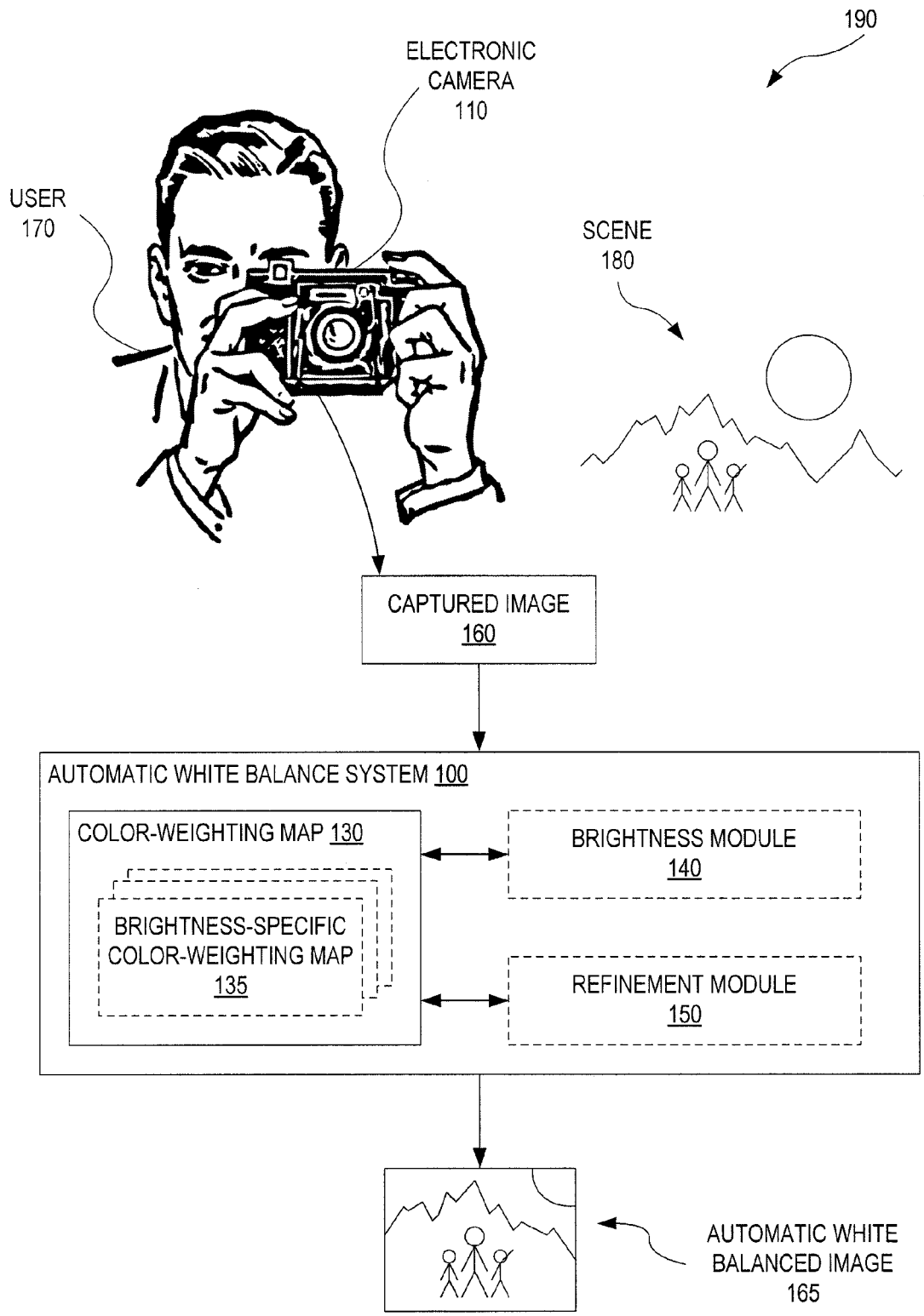
FIG. 1 illustrates an AWB system implemented in an exemplary use scenario, according to an embodiment.
Figure 2:
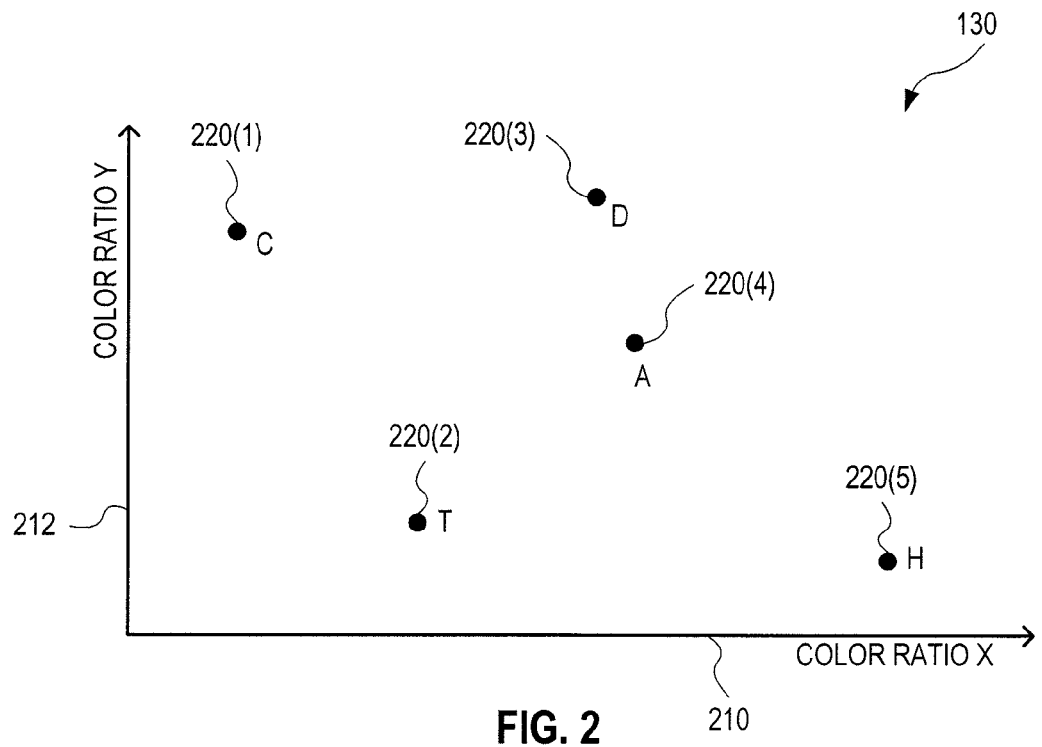
FIG. 2 illustrates a color-weighting map, according to an embodiment.

FIG. 1 illustrates one exemplary AWB system 100 implemented in an exemplary use scenario 190. An electronic color camera 110, operated by a user 170, captures an electronic color image, captured image 160, of a scene 180. AWB system 100 includes a color-weighting map 130 specifying AWB parameters. AWB system 100 uses color-weighting map 130 to generate an automatic white balanced image (AWB image) 165 from captured image 160. In certain embodiments, AWB system 100 is implemented within electronic color camera 110. FIG. 2 illustrates color-weighting map 130 according to one exemplary implementation. FIGS. 1 and 2 are best viewed together.

Color-weighting map 130 indicates a plurality of illuminant-specific AWB parameters 220 in a color ratio Y (axis 212) versus color ratio X (axis 210) plot. Color ratio Y and color ratio X are two color ratios that cooperate to specify the relative weight of three primary colors, such as red (R), green (G), and blue (B), associated with captured image 160. In one example, color ratio Y is Log(B/R) and color ratio X is Log (B*R/(G*G)). In another example, color ratio Y is B/R and color ratio X is B*R/(G*G). In yet another example, color ratio Y is G/R and color ratio X is B/R. However, color ratios X and Y may be other color ratios that cooperate to specify the relative weight of primary colors, and the primary colors may be different from R, G, and B, without departing from the scope hereof. Although illustrated in FIG. 2 as a plot of ordered pairs [color ratio X, color ratio Y], color-weighting map 130 may be a non-graphical representation of AWB parameters 220, such as a table of ordered pairs [color ratio X, color ratio Y] associated with AWB parameters 220.

Illuminant-specific AWB parameters 220 include AWB parameters 220(1), 220(2), 220(3), 220(4), and 220(5) respectively associated with illuminant C (cool white fluorescent, color temperature 4230 Kelvin), illuminant TL84 (commonly used fluorescent illuminant, color temperature 4000 Kelvin), illuminant D65 (simulated noon daylight, color temperature 6504 Kelvin), illuminant A (incandescent tungsten, color temperature 2856 Kelvin, and illuminant H (simulated horizon natural light at sunset, color temperature 2300 Kelvin). Without departing from the scope hereof, AWB parameters 220 may represent other illuminants than shown in FIG. 2, and the number of AWB parameters 220 may differ from that shown in FIG. 2.

AWB system 100 first analyzes the distribution of colors in captured image 160 to determine which one of illuminants C, T, D, A, and H most accurately describe the color distribution of captured image 160. For this purpose, AWB system 100 may utilize methods disclosed in U.S. Patent Application Publication No. US 2014/0267782 A1, incorporated by reference herein in its entirety, and/or other methods known in the art. Next, AWB system 100 applies the associated AWB parameter 220 to the color data of captured image 160 to generate AWB image 165. Thus, AWB system 100 extracts the ordered pair [color ratio X, color ratio Y] for the selected AWB parameter 220 from color weighting map 130, and corrects colors of captured image 160 according to color gains determined from the ordered pair [color ratio X, color ratio Y] to generate AWB image 165.

In one embodiment, AWB system 100 includes a brightness module 140 and color-weighting map 130 is implemented as a plurality of brightness-specific color-weighting maps 135 applicable to a respective plurality of mutually different brightnesses of scene 180. For example, in one embodiment, AWB system 100 includes three brightness-specific color-weighting maps 135 associated with scene 180 of low brightness, moderate brightness, and high brightness, respectively. However, AWB system 100 may include any number of brightness-specific color-weighting maps 135 applicable to a respective plurality of mutually different brightnesses of scene 180. Each brightness-specific color-weighting map 135 is an embodiment of color-weighting map 130 with AWB parameters 220 specific to certain brightness of scene 180. Brightness module 140 determines the brightness of scene 180, captured in captured image 160, and selects a brightness-specific color-weighting map 135 associated with this brightness. AWB system 100 then uses the selected brightness-specific color-weighting map 135 to correct colors of captured image 160 to produce AWB image 165, as discussed above.

In another embodiment, AWB system 100 includes a refinement module 150 that refines color-weighting map 130, optionally implemented as brightness-specific color-weighting maps 135, based upon one or more captured images 160. Refinement module 150 may refine color-weighting map 130 after transfer of electronic color camera 110 to a consumer. Refinement module 150 thus enables self-training of color-weighting map 130 to optimize color-weighting map 130 for the actual use by user 170 and/or to correct inaccuracies in the pre-calibration of color-weighting map 130 performed by the manufacturer of electronic color camera 110. As a result, refinement module 150 potentially reduces the requirements to this pre-calibration. For example, the manufacturer may prepare all electronic color cameras 110 of one manufacturing batch with identical color-weighting maps 130 determined by calibrating a "golden module", and eliminate the otherwise customary calibration of individual units.

Figure 3:
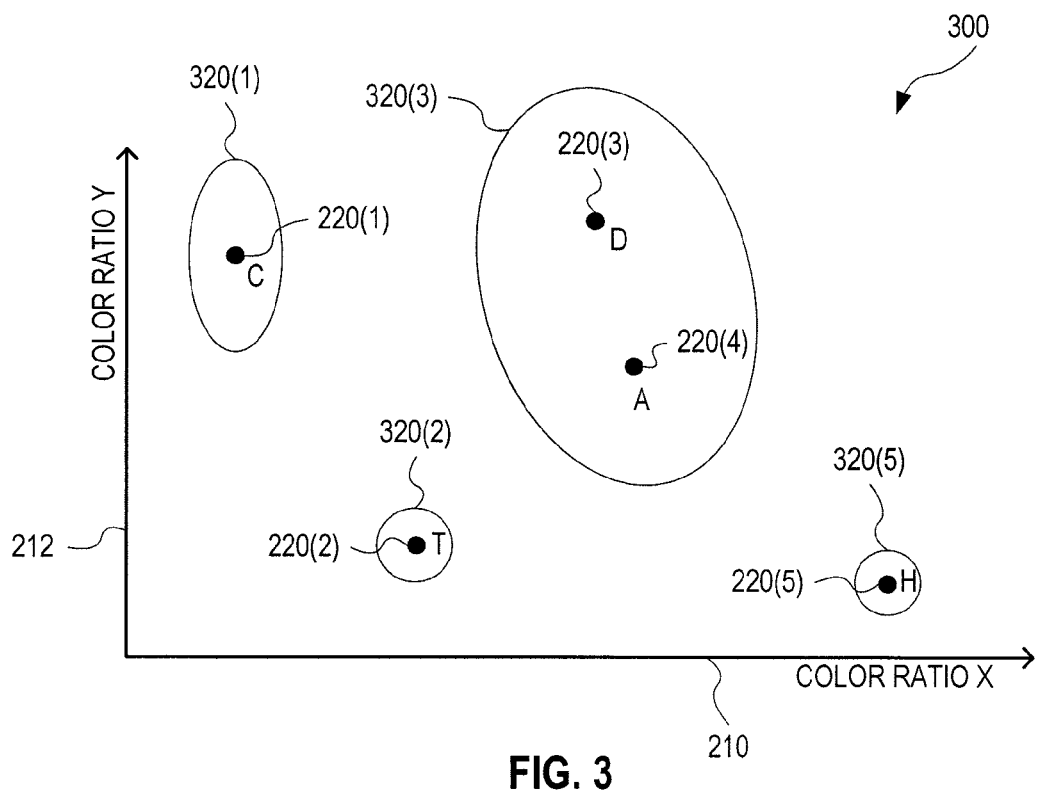
FIG. 3 illustrates a color-weighting map that indicates illuminant-specific probability distributions, according to an embodiment.

FIG. 3 illustrates one exemplary color-weighting map 300 which is an embodiment of color-weighting map 130. Color-weighting map 300 indicates illuminant-specific probability distributions 320 of the ordered pair [color ratio X, color ratio Y] used in FIG. 2, together with AWB parameters 220 of FIG. 2.

Probability distribution 320(1) is a probability distribution of the ordered pair [color ratio X, color ratio Y] for illuminant C. Probability distribution 320(2) is a probability distribution of the ordered pair [color ratio X, color ratio Y] for illuminant TL84. Probability distribution 320(3) is a probability distribution of the ordered pair [color ratio X, color ratio Y] for illuminants D65 and A. Probability distribution 320(5) is a probability distribution of the ordered pair [color ratio X, color ratio Y] for illuminant H. FIG. 3 schematically shows each of probability distributions 320 as a surface contour corresponding to a certain value of probability distribution 320, such as 10% or 1/e of the maximum value of probability distribution 320. In one example, each AWB parameter 220 are located at a peak of the associated probability distribution 320.

In the example shown in FIG. 3, the two probability distributions associated with illuminants D and A overlap and are therefore indicated by a single surface contour of a common probability distribution 320(3). Probability distribution 320(3) may be composed of two distinguishable sub-distributions respectively associated with illuminants D and A. In one example, probability distribution 320(3) has two peaks respectively associated with illuminants D and A. In another example, the overlap between the two sub-distributions associated with illuminants D and A are such that probability distribution 320(3) exhibits only a single peak. Without departing from the scope hereof, the two probability distributions associated with illuminants D and A may be non-overlapping or have less overlap than shown in FIG. 3.

Each probability distribution 320 represents the statistical spread in the ordered pair [color ratio X, color ratio Y] for the associated illuminant. This spread may be attributed to a variety of factors including, but not limited, sensor-to-sensor variation (relating to variation between different electronic color cameras 110), illuminant-to-illuminant variation, and spatial/temporal intra-sensor variation due to, for example, electronic noise and/or temperature dependencies.

Figure 4:
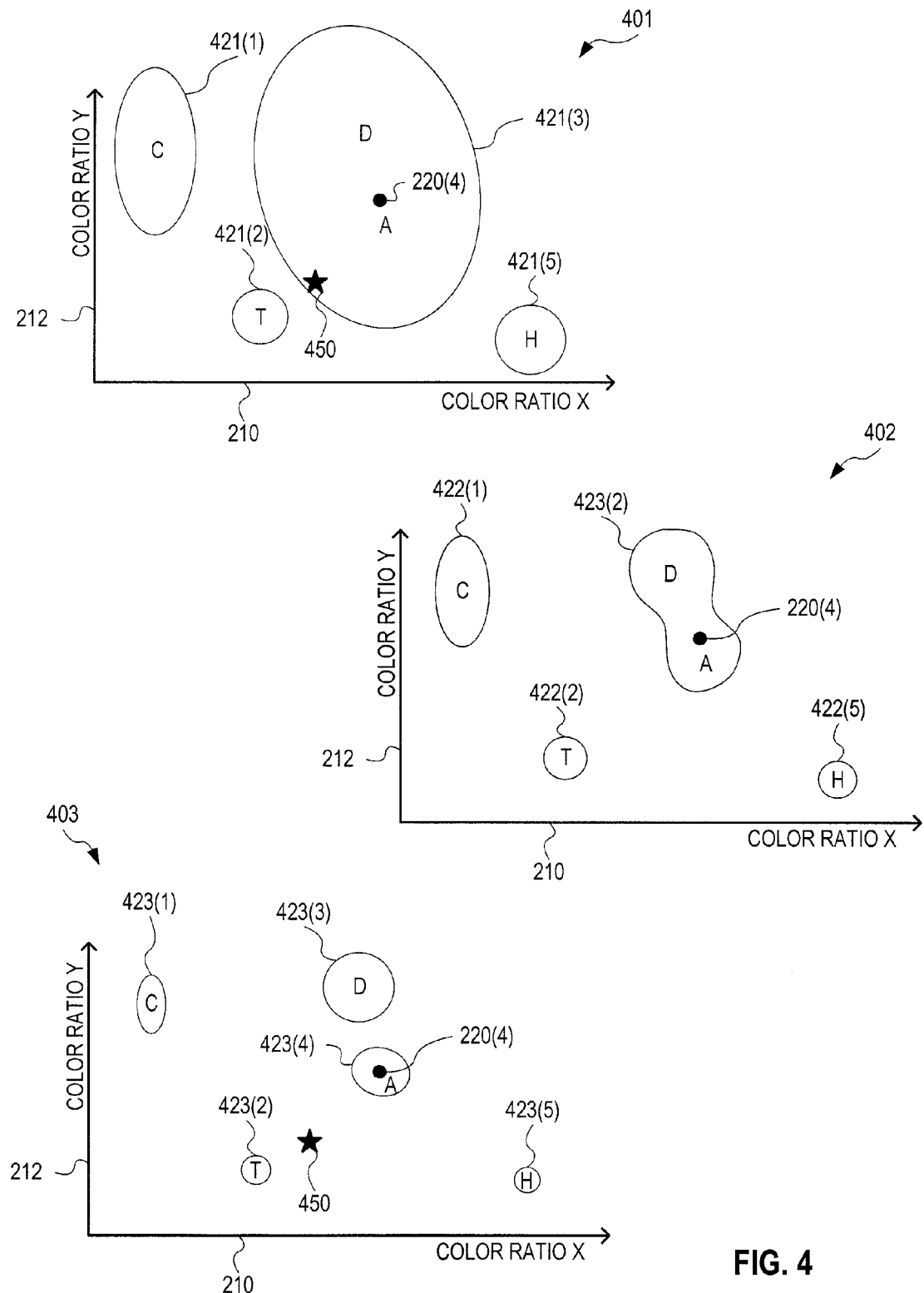
FIG. 4 illustrates brightness-specific color-weighting maps, according to an embodiment.

FIG. 4 illustrates brightness-specific color-weighting maps 401, 402, and 403. Each of brightness-specific color-weighting maps 401, 402, and 403 is an example of color-weighting map 300 (FIG. 3). Brightness-specific color-weighting map 401 indicates probability distributions 421 for illuminants C, T, D, A, and H for dim scenes 180 (FIG. 1). Brightness-specific color-weighting map 402 indicates probability distributions 422 for illuminants C, T, D, A, and H for moderately bright scenes 180. Brightness-specific color-weighting map 403 indicates probability distributions 423 for illuminants C, T, D, A, and H for bright scenes 180. For clarity of illustration, only AWB parameter 220(4), in this case brightness-specific, is shown in FIG. 4.

Each probability distribution 421, 422, and 423 is an example of probability distribution 320, and is both illuminant-specific and brightness-specific. At low brightness, the spread of the ordered pair [color ratio X, color ratio Y] for a given illuminant is more sensitive to various types of noise/variation. Therefore, in general, the spread of probability distributions 421 is greater than the respective spread of probability distributions 422, and the spread of probability distributions 422 is greater than the respective spread of probability distributions 423.

In the example of FIG. 4, as is the case for the example of FIG. 3, the probability distributions for illuminants D and A overlap for the brightnesses relating to brightness-specific color-weighting maps 401 and 402. However, in brightness-specific color-weighting map 403, the relative noise-contribution to the spread of the probability distributions associated with illuminants D and A is sufficiently small to define two separate probability distributions 423(3) and 423(4) respectively associated with illuminants D and A.

While the relatively confined probability distributions 423 of brightness-specific color-weighting map 403 provide a relatively accurate determination of AWB parameters 220, brightness-specific color-weighting map 403 may not represent a dim scene 180 as well as brightness-specific color-weighting map 401. This is illustrated for a point 450, which indicates the average value of the ordered pair [color ratio X, color ratio Y] for a captured image 160 of a dim scene 180 illuminated by illuminant A. When brightness-specific color-weighting map 401 is implemented in AWB system 100, brightness module 140 properly identifies point A as being associated with a illuminant A. For comparison, a prior-art AWB system utilizing only a single color-weighting map, for example similar to brightness-specific color-weighting map 403, may fail to correctly process point 450. Such a prior-art AWB may either erroneously conclude that illuminant T was used to obtain point 450 or simply fail to identify the illuminant associated with point 450. In addition, the location of AWB parameters 220 may be brightness-dependent. For example, AWB parameter 220(4) may have three somewhat different locations in brightness-specific color-weighting maps 401, 402, and 403, respectively. In such cases, the automatic white balancing performed by AWB system 100 implemented with brightness-specific color-weighting maps 401, 402, and 403 is improved, as compared to a prior-art AWB system operating with only a single color-weighting map.

Figure 5:
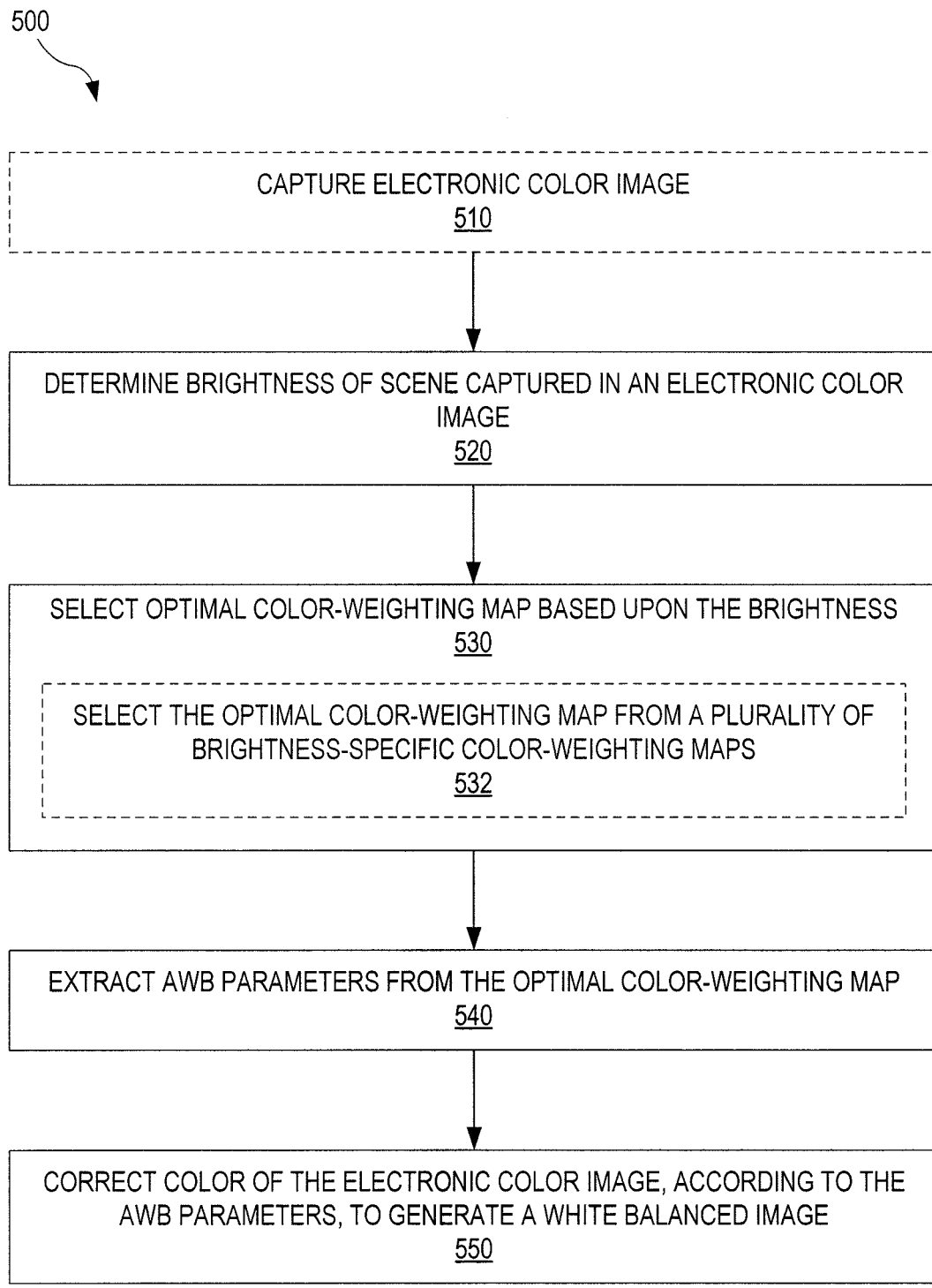
FIG. 5 illustrates a brightness-sensitive AWB method, according to an embodiment.

FIG. 5 illustrates one exemplary brightness-sensitive AWB method 500 which is implemented in an embodiment of AWB system 100 (FIG. 1) that includes brightness module 140 and a plurality of brightness-specific color-weighting maps 135, such as brightness-specific color-weighting maps 401, 402, and 403 (FIG. 4).

Brightness-sensitive AWB method 500 may include a step 510. In optional step 510, electronic color camera 110 captures captured image 160.

In a step 520, AWB system 100 receives captured image 160, and brightness module 140 determines the brightness of scene 180 represented by captured image 160.

In a step 530, brightness module 140 selects an optimal color-weighting map based upon the brightness determined in step 520. Step 520 may include a step 532, wherein brightness module 140 selects an optimal one of a plurality of brightness-specific color-weighting maps 135, such as brightness-specific color-weighting maps 401, 402, and 403.

The optimal brightness-specific color-weighting map is the brightness-specific color-weighting map associated with a scene brightness most similar to the brightness of scene 180 represented by captured image 160 received in step 520. In certain embodiments, the optimal brightness-specific color-weighting map is the one of the plurality of brightness-specific color-weighting maps 135, which has been calibrated for scenes of brightness most similar to the brightness of scene 180 represented by captured image 160 received in step 520. Generation of such brightness-calibrated color-weighting maps is discussed further in reference to FIG. 14 below.

In a step 540, AWB system 100 extracts AWB parameter 220, associated with one illuminant, from the optimal color-weighting map selected in step 530.

In a step 550, AWB system 100 corrects the color of captured image 160, according to AWB parameter 220 extracted in step 540, to generate AWB image 165.

FIG. 6 illustrates one exemplary adaptive AWB method 600 which is implemented in an embodiment of AWB system 100 (FIG. 1) that includes refinement module 150.

In an optional step 610, electronic color camera 110 captures captured image 160 of scene 180 illuminated by an illuminant of a certain spectral type.

In a step 620, AWB system 100 receives captured image 160, and refinement module 150 refines color-weighting map 130 based upon captured image 160. Step 620 includes a step 625, wherein refinement module 150 refines an illuminant-specific probability distribution 320 (FIG. 3) associated with the illuminant used to illuminate scene 180 represented by captured image 160.

Adaptive AWB method 600 may perform step 620 multiple times. In one such example, adaptive AWB method 600 performs step 620, and optionally step 610, two or more times to iteratively refine a single illuminant-specific probability distribution 320 based upon two or more respective captured images 160. In another such example, adaptive AWB method 600 performs step 620, and optionally step 610, for two or more captured images 160 associated with illuminants of two or more different spectral types, respectively. In this example, adaptive AWB method 600 thereby refines two or more illuminant-specific probability distributions 320 respectively associated with different spectral types of illuminants, such as illuminants D and H (see FIG. 3, for example). In yet another example, adaptive AWB method 600 performs step 620, and optionally step 610, for three or more captured images 160 that include (a) captured images 160 associated with illuminants of different spectral types and (b) captured images 160 associated with the same spectral type of illuminant.

Optionally, adaptive AWB method 600 further includes step 630 and 640. In step 630, AWB system 100 extracts AWB parameter 220, associated with the illuminant of step 610, from color-weighting map 130 refined in step 620. Step 630 may include a step 635. In step 635, AWB parameter 220 is extracted from probability distribution 320 associated with AWB parameter 220.

In step 640, AWB system 100 corrects color of a captured image 160, for example that received in step 620, of a scene 180 illuminated by the illuminant of step 610 to generate AWB image 165.

In an embodiment, captured image 160 received in step 620 represents a scene 180 of a certain brightness, such that step 620 refines a brightness-specific, illuminant-specific probability distribution, for example one of probability distributions 421, 422, and 423 (FIG. 4). In this embodiment, step 630 extracts AWB parameters 220 from brightness-specific color-weighting map 135 (such as one of brightness-specific color weighting maps 401, 401, and 403), wherein AWB parameter 220 corresponds to the illuminant spectral type and brightness-specific color-weighting map 135 is associated with the brightness of scene 180.

Figure 7:
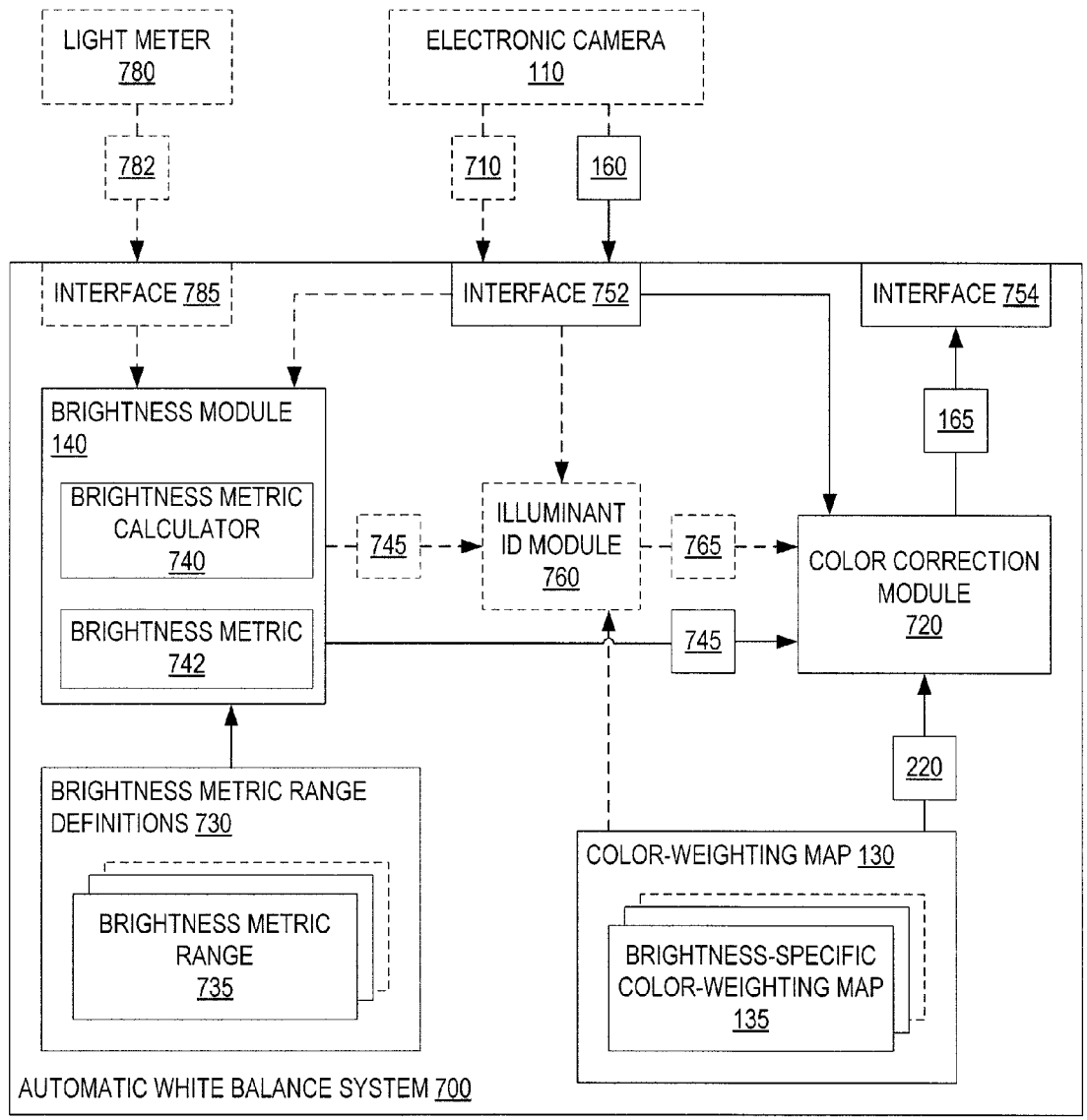
FIG. 7 illustrates a brightness-sensitive AWB system, according to an embodiment.

FIG. 7 illustrates one exemplary brightness-sensitive AWB system 700 which is an embodiment of AWB system 100 (FIG. 1). In AWB system 700, brightness module 140 includes a brightness metric calculator 740, and color-weighting map 130 includes at least two brightness-specific color-weighing maps 135 such as at least two of brightness-specific color-weighting maps 401, 402, and 403 (FIG. 4). Brightness metric calculator 740 calculates a brightness metric that indicates brightness of scene 180 represented by captured image 160.

AWB system 700 includes brightness metric range definitions 730 having at least two brightness metric ranges 735. The at least two brightness metric ranges 735 specify the applicable brightness range for the at least two brightness-specific color-weighting maps 135, respectively. AWB system 700 further includes a color-correction module 720 that corrects color of captured image 160 to produce AWB image 165.

Additionally, AWB system 700 includes (a) an interface 752 configured to receive captured image 160 from electronic color camera 110 and (b) an interface 754 configured to output AWB image 165. Optionally interface 752 is further configured to receive camera settings 710, pertaining to captured image 160, from electronic color camera 110. AWB system 700 may be implemented in electronic camera 110. Camera settings 710 are, for example, settings of electronic color camera 110 that affect the brightness of captured image 160, such as exposure time $T_{exp}$ and electronic gain $g_e$.

Optionally, AWB system 700 includes an illuminant identification module 760 that identifies the spectral type of illuminant used to illuminate scene 180 represented by captured image 160.

In an embodiment, AWB system 700 includes an interface 785 configured to receive, from a light meter 780, a brightness measurement 782 for scene 180. Although not illustrated in FIG. 7, light meter 780 may be implemented in electronic color camera 110.

Figure 8:
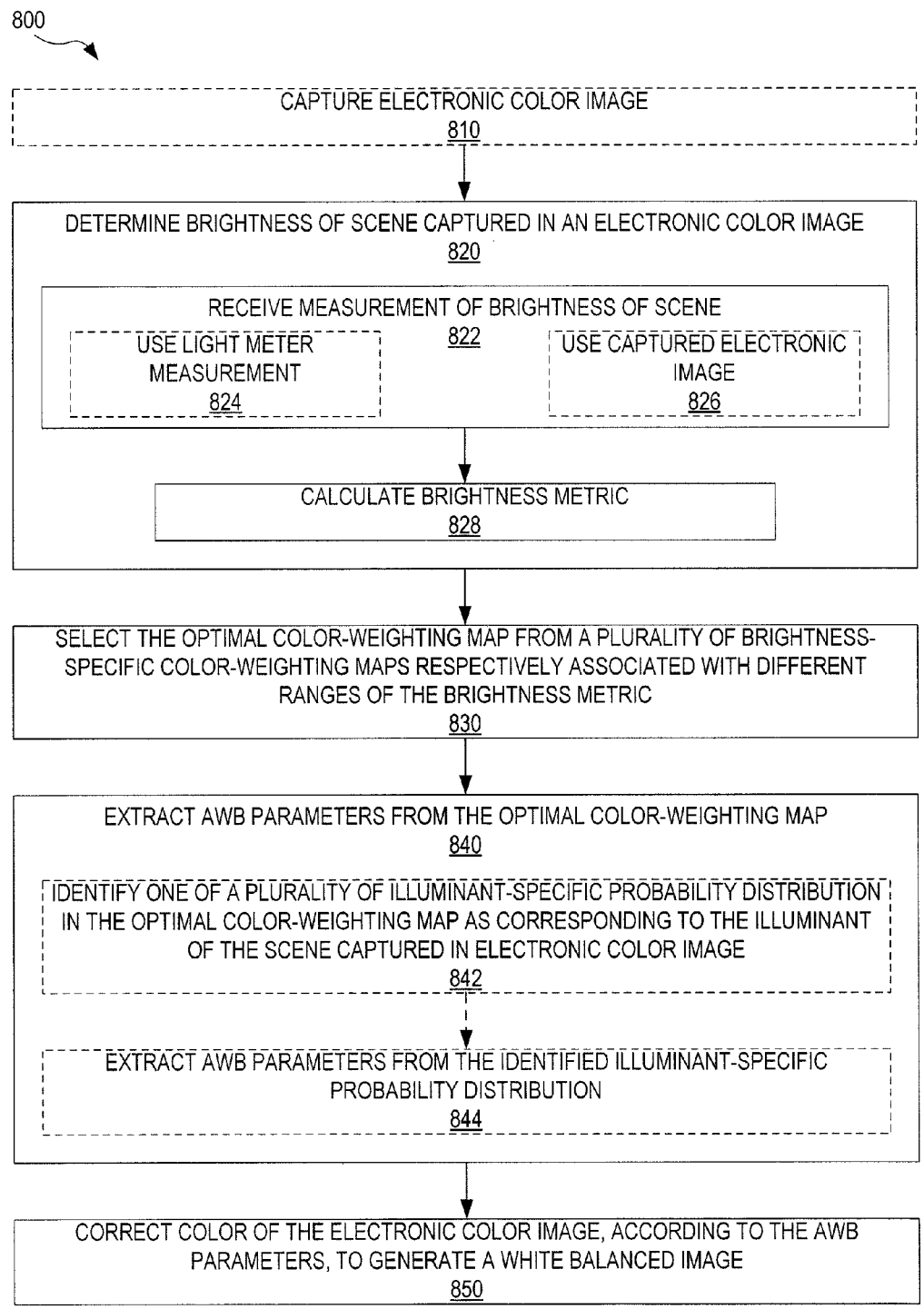
FIG. 8 illustrates a brightness-sensitive AWB method implemented by the AWB system of FIG. 7, according to an embodiment.

FIG. 8 illustrates one brightness-sensitive AWB method 800 implemented by AWB system 700 (FIG. 7). Brightness-sensitive AWB method 800 is an embodiment of brightness-sensitive AWB method 500 (FIG. 5). FIG. 8 is best viewed together with FIG. 7.

In an optional step 810, electronic color camera 110 captures captured image 160. Step 810 is similar to step 510 of brightness-sensitive AWB method 500.

In a step 820, brightness module 140 (as implemented in AWB system 700) determines the brightness of scene 180 represented by captured image 160. Step 820 is an embodiment of step 520. Step 820 includes step 822 and 828. In step 822, brightness module 140 receives a measurement of the brightness of scene 180. In step 824, brightness metric calculator 740 calculates a brightness metric 742 based upon the brightness measurement received in step 822.

In one embodiment, step 822 performs a step 824 to obtain the brightness measurement. In step 824, brightness module 140 receives brightness measurement 782 from interface 785.

In another embodiment, step 822 performs a step 826 to obtain the brightness measurement. In step 826, brightness module 140 receives captured image 160 and camera settings 710 from interface 752. In this embodiment, brightness metric calculator 740 calculates, in step 828, brightness metric 742 from captured image 160 and camera settings 710. In one example hereof, brightness metric calculator 740 calculates brightness metric 742 as $T_{exp}*g_e/B_{mean}$, wherein $B_{mean}$ is mean brightness of captured image 160, or as a value that is proportional to $T_{exp}*g_e/B_{mean}$.

In a step 830, brightness module 140 selects the optimal color-weighting map from brightness-specific color weighting maps 135. Brightness module performs this selection by comparing brightness metric 742 to brightness metric ranges 735. Based upon this comparison, brightness module 140 generates a brightness identifier 745 that specifies which one of brightness-specific color-weighting maps 135 is the optimal color-weighting map. Step 830 is an embodiment of step 530. In one example of step 830, brightness module 140 selects (a) brightness-specific color-weighting map 401 when brightness metric 742 is below a first threshold, (b) brightness-specific color-weighting map 402 when brightness metric 742 is between the first threshold and a second threshold that is higher than the first threshold, and (c) brightness-specific color-weighting map 403 when brightness metric 742 is above the second threshold.

In a step 840, color correction module 720 extracts AWB parameter 220 from the optimal color-weighting map selected in step 830. Color correction module 720 receives brightness identifier 745 from brightness module 140 and extracts AWB parameter 220 from the brightness-specific color-weighting map 135 specified by brightness identifier 745. Step 840 is an embodiment of step 540.

In an embodiment, step 840 includes steps 842 and 844. In step 842, illuminant identification module 760 processes captured image 160 to generate an illuminant identifier 765 that specifies the spectral type of illuminant used to illuminate scene 180 represented by captured image 160. For this purpose, illuminant identification module 760 processes captured image 160 and brightness identifier 745 to compare color properties of captured image 160 with illuminant-specific probability distributions of the brightness-specific color-weighting map 135 specified by brightness identifier 745. For example, illuminant identification module 760 compares color properties of captured image 160 with illuminant-specific probability distributions 421, 422, or 423 of the one of brightness-specific color-weighting maps 401, 402, and 403 (FIG. 4) specified by brightness identifier 745. Illuminant identification module 760 may utilize methods disclosed in U.S. Patent Application Publication No. US 2014/0267782 A1 and/or other methods known in the art. Illuminant identification module 760 thus determines which one of the illuminant-specific probability distributions best represent illumination of scene 180 in captured image 160.

In step 844, color correction module 720 extracts the AWB parameter 220 associated with illuminant identifier 765 from the brightness-specific color-weighting map 135 specified by brightness identifier 745. In one example of step 844, color-correction module 720 (a) receives brightness identifier 745 specifying brightness-specific color-weighting map 403, and illuminant identifier 765 specifying probability distribution 423(1), and (b) extracts the AWB parameter associated with illuminant-specific probability distribution 423(1) from brightness-specific color-weighting map 403.

In a step 850, color correction module 720 corrects color of captured image 160, according to AWB parameter 220 extracted in step 840, to generate AWB image 165. Color-correction module 720 outputs AWB image 165 to interface 754. Alternately, color-correction module 720 stores AWB image 165. Step 850 is an embodiment of step 550.

Figure 9:
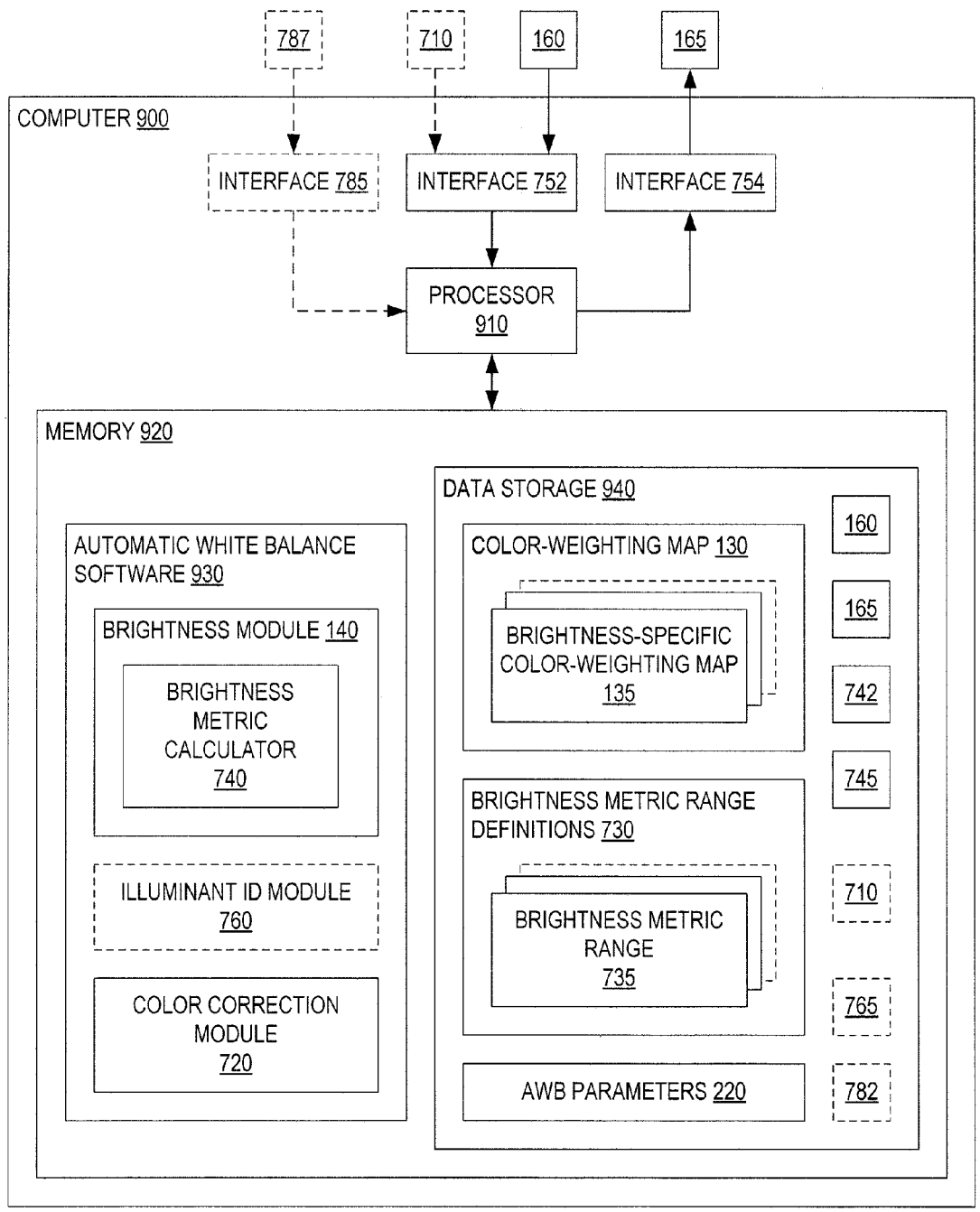
FIG. 9 illustrates a computer that implements the AWB system of FIG. 7, according to an embodiment.

FIG. 9 illustrates one exemplary computer 900 that implements AWB system 700 (FIG. 7). Computer 900 includes a processor 910, a memory 920, interfaces 752 and 754, and optionally interface 785. Processor 910 is communicatively coupled with memory 920, interfaces 752 and 754, and optionally interface 785.

Memory 920 includes AWB software 930 implemented as machine-readable instructions, executable by processor 910, in a non-transitory portion of memory 920. AWB software 930 implements (a) brightness module 140 with brightness metric calculator 740, (b) color correction module 720, and optionally (c) illuminant identification module 760. Without departing from the scope hereof, AWB software 930 may be implemented as firmware.

Memory 920 further includes a data storage 940. Data storage 940 includes color-weighting maps 130 with at least two brightness-specific color weighting maps 135, and brightness metric range definitions 730 with at least two brightness metric ranges 735 respectively corresponding to the at least two brightness-specific color weighting maps 135. Memory 920 further includes storage for captured image 160, AWB image 165, AWB parameters 220, brightness metric 742, brightness identifier 745, and, optionally, one or more of camera settings 710, illuminant identifier 765, and brightness measurement 782.

Memory 920 is, for example, of type ROM, Flash, magnetic tape, magnetic drive, optical drive, RAM, other non-transitory medium, or combinations thereof. Each of interfaces 752, 754, and 785 is for example a wired interface (such as Ethernet, USB, FireWire, or Thunderbolt) and/or a wireless interface (such as Wi-Fi or bluetooth).

Figure 10:
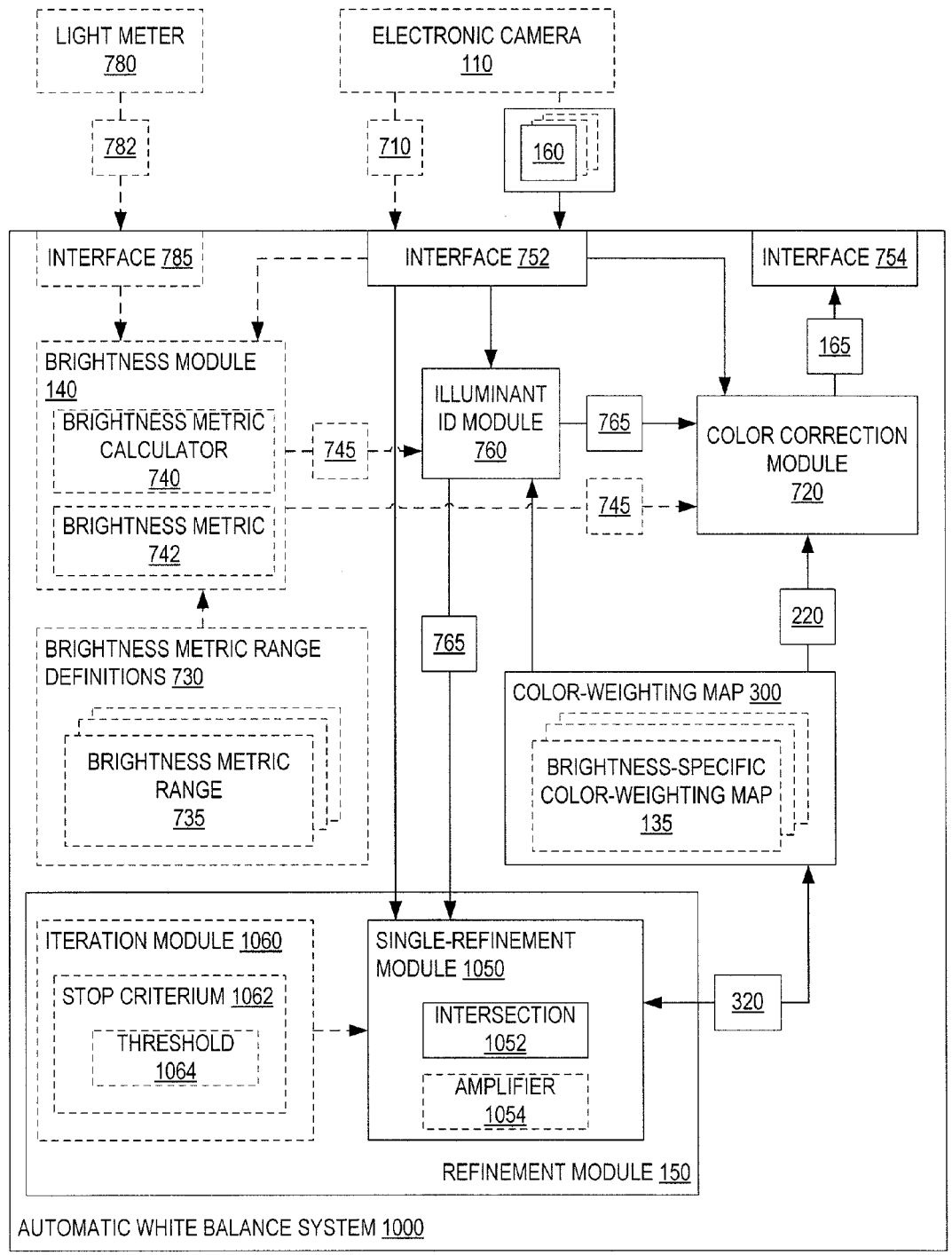
FIG. 10 illustrates an adaptive AWB system, according to an embodiment.

FIG. 10 illustrates one exemplary adaptive AWB system 1000 which is an embodiment of AWB system 100 (FIG. 1). AWB system 1000 includes refinement module 150, implemented with a single-refinement module 1050 that performs a single refinement of an illuminant-specific probability distribution 320 (FIG. 3) of color-weighting map 300. Single-refinement module 1050 includes an intersection calculator 1052 that calculates the intersection between two distributions. Single-refinement module 1050 may also include an amplifier 1054 that amplifies a portion of a distribution. In certain embodiments, refinement module 150 further includes an iteration module 1060 that controls iterative execution of single-refinement module 1050. Iteration module 1060 may include a stop criterium 1062, such as a threshold 1064, for termination of iterative executions of single-refinement module 1050. AWB system 1000 further includes color correction module 720 (FIG. 7), illuminant identification module 760, and interfaces 752 and 754, as discussed in reference to FIG. 7. Additionally, AWB system 1000 includes color-weighting map 300 (FIG. 3), optionally implemented as a plurality of brightness-specific color-weighting maps such as at least two of brightness-specific color-weighting maps 401, 402, and 403 (FIG. 4).

In one embodiment, AWB system 1000 is configured for brightness-sensitive automatic white balancing as discussed, for example, in reference to FIG. 7. In this brightness-sensitive embodiment, AWB system 1000 includes brightness module 140, brightness metric range definitions 730, and optionally interface 785. In the brightness-sensitive embodiment of AWB system 1000, color-weighting map 130 is implemented with a plurality of brightness-specific color weighting maps 135, for example brightness-specific color-weighting maps 401, 402, and 403 (FIG. 4). Brightness module 140, brightness metric range definitions 730, optional interface 785, and brightness-specific color-weighting maps function as discussed in reference to FIG. 7. In this brightness-sensitive embodiment, refinement module 150 refines one or more illuminant-specific probability distributions 320 of brightness-specific color-weighting map 135, such as one or more probability distributions 421, 422, and/or 423 of brightness-specific color-weighting map 401, 402, and 403.

Figure 11:
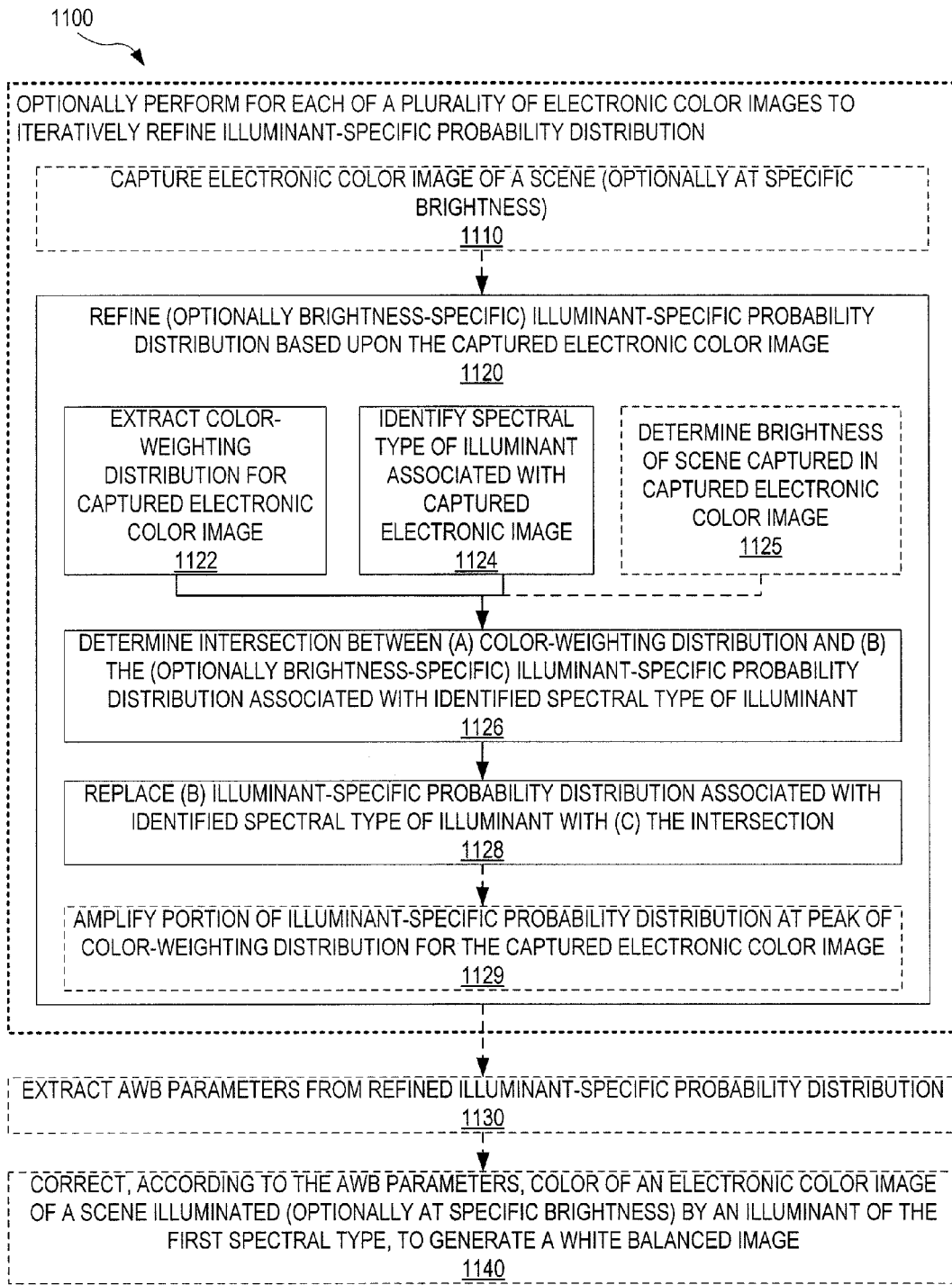
FIG. 11 illustrates an adaptive AWB method implemented by the AWB system of FIG. 10, according to an embodiment.
Figure 12:
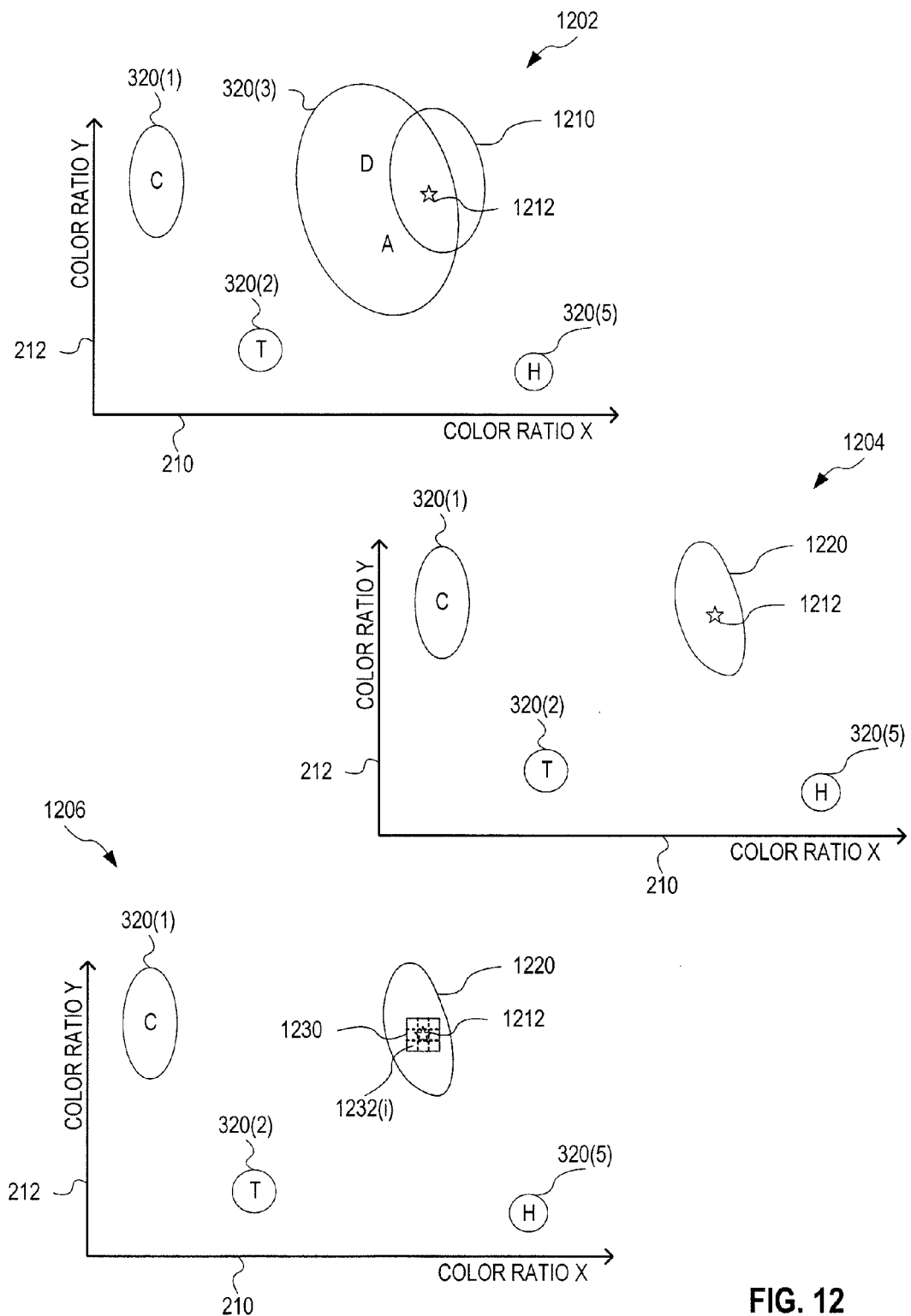
FIG. 12 illustrates refinement operations performed in certain steps of the adaptive AWB method of FIG. 11, according to an embodiment.

FIG. 11 illustrates one adaptive AWB method 1100 implemented by AWB system 1000 (FIG. 10). Adaptive AWB method 1100 refines color-weighting map 300 (FIG. 3) and is an embodiment of adaptive AWB method 600 (FIG. 6). FIG. 12 illustrates refinement operations performed in certain steps of adaptive AWB method 1100 (FIG. 11). FIG. 11 is best viewed together with FIGS. 10 and 12.

In an optional step 1110, electronic color camera 110 captures captured image 160 of scene 180 illuminated by an illuminant of a certain spectral type. Optionally, scene 180 has a certain brightness. Step 1110 is similar to step 610.

In a step 1120, refinement module 150 (as implemented in AWB system 1000) refines illuminant-specific probability distribution 320 associated with the certain spectral type of illuminant. Step 1120 includes steps 1122, 1124, 1126, 1128, and optionally one or both of steps 1125 and 1129. Step 1120 is an embodiment of step 620.

In step 1122, single-refinement module 1050 receives captured image 160 from interface 752 and extracts, from captured image 160, the color-weighting distribution of the ordered pair [color ratio X, color ratio Y] used for color-weighting map 300.

A diagram 1202 in FIG. 12 illustrates one example of step 1122. Diagram 1202 shows a color-weighting distribution 1210, extracted from captured image 160 in step 1122. Color-weighting distribution 1210 is superimposed on color-weighting map 300 and indicated by a surface contour. Color-weighting distribution 1210 has a peak 1212, i.e., global maximum.

In step 1124, illuminant identification module 760 identifies the spectral type of illuminant used to illuminate scene 180 represented by captured image 160. Illuminant identification module 760 may identify the spectral type of illuminant based upon the color-weighting distribution extracted in step 1122.

In step 1126, single-refinement module 1050 receives illuminant identifier 765 from illuminant identification module 760 and extracts the associated illuminant-specific probability distribution 320 from color-weighting map 300. Intersection calculator 1052 determines the intersection between (a) the color-weighting distribution extracted in step 1122 and (b) the illuminant-specific probability distribution 320 associated with captured image 160. Step 1126 thus results in a refined illuminant-specific probability distribution 320. Herein, "intersection" refers to a distribution that represents an intersection between two input distributions. The intersection may be a geometrical intersection or a mathematical measure that indicates a region of greater overlap between the two input distributions. Intersection calculator 1052 may calculate the intersection using methods known in the art. For example, intersection calculator 1052 may calculate the intersection as a product (or scaled product) between the two input distributions.

A diagram 1204 in FIG. 12 illustrates one example of step 1126. Diagram 1204 shows an intersection 1220 between color-weighting distribution 1210 and an associated illuminant-specific probability distribution 320(3).

In a step 1128, single-refinement module 1050 replaces, in color-weighting map 300, illuminant-specific probability distribution 320 with the intersection calculated in step 1126. Single-refinement module 1050 thereby refines illuminant-specific probability distribution 320 of color-weighting map 300.

In one example of step 1128, single-refinement module 1050 replaces illuminant-specific probability distribution 320 (3) with intersection 1220 (see diagram 1204 of FIG. 12).

In optional step 1129, amplifier 1054 amplifies a portion of the refined illuminant-specific probability distribution 320, produced in step 1126, which is at or near the peak of the color-weighting distribution extracted in step 1122. Single-refinement module 1050 replaces the illuminant-specific probability distribution 320 (refined in step 1126) of color-weighting map 300 with the amplified distribution. Single-refinement module 1050 thereby further refines illuminant-specific probability distribution 320 of color-weighting map 300. Step 1129 may have the effect of stabilizing illuminant-specific probability distribution 320 in regards to further subsequent refinements thereof.

A diagram 1206 in FIG. 12 illustrates one example of step 1129. Diagram 1206 shows a region 1230 located at peak 1212. In this example of step 1129, amplifier 1054 amplifies region 1230 of intersection 1220 which, at this point in adaptive AWB method, is the refined illuminant-specific probability distribution 320(3). Amplifier 1054 may apply a non-uniform amplification to region 1230. For example, amplifier 1054 applies greater amplification near peak 1212 than further away from peak 1212. Region 1230 may be composed of a plurality of cells 1232. Diagram 1206 shows a 3×3 grid of cells. However, the number or cells may be different and the grid may be non-square, without departing from the scope hereof. Each cell 1232 may be associated with an amplification factor which may be different for different cells 1232. Each cell 1232 may have the smallest possible size consistent with the resolution of color ratios X and Y, i.e., the resolution of axes 210 and 212.

Adaptive AWB method 1100 may perform step 1120, and optionally step 1110, for a plurality of captured images 160 of scenes 180 illuminated by illuminants of same or similar spectral type, to iteratively refine illuminant-specific probability distribution 320. Iteration module 1060 iteratively executes single-refinement module 1050 on such a plurality of captured images 160. Iteration module 1060 may invoke stop criterium 1062 to determine when and/or if to terminate the iterations. For example, iteration module 1060 may terminate the iterations when the difference between (a) illuminant-specific probability distribution 320 produced by the current iteration and (b) illuminant-specific probability distribution 320 produced by the most recent prior iteration is below threshold 1064.

Adaptive AWB method 1100 may also perform step 1120, and optionally step 1110, for a plurality of captured images 160 of scenes 180 illuminated by illuminants of different spectral type, to iteratively or non-iteratively refine a plurality of different illuminant-specific probability distribution 320 respectively associated with different spectral types of illuminants.

Optionally, adaptive AWB method 1100 includes steps 1130 and 1140. Steps 1130 and 1140 are embodiments of steps 630 and 640, respectively. Steps 1130 and 1140 are similar to steps 840 and 850 of brightness-sensitive AWB method 800 (FIG. 8). AWB system 1000 performs steps 1130 and 1140 in a similar fashion that AWB system 700 performs steps 840 and 850. However, in the case of adaptive AWB method 1100, color correction module 720 utilizes a refined color-weighting map 300. AWB system 1000 may apply steps 1130 and 1140 to a captured image 160 used in step 1120, or to a different captured image 160.

In certain embodiments, AWB system 1000 is brightness-sensitive and applies adaptive AWB method 1100 to brightness-sensitive color-weighting maps 135. In such embodiments, step 1120 includes step 1125, wherein brightness module 140 determines the brightness of scene 180 represented by captured image 160 and selects the corresponding brightness-specific color-weighting map 135 for processing in steps 1126, 1128, and optionally 1129. Brightness module 140 performs step 1125 as discussed in reference to steps 820 and 830 of brightness-sensitive AWB method 800.

Figure 13:
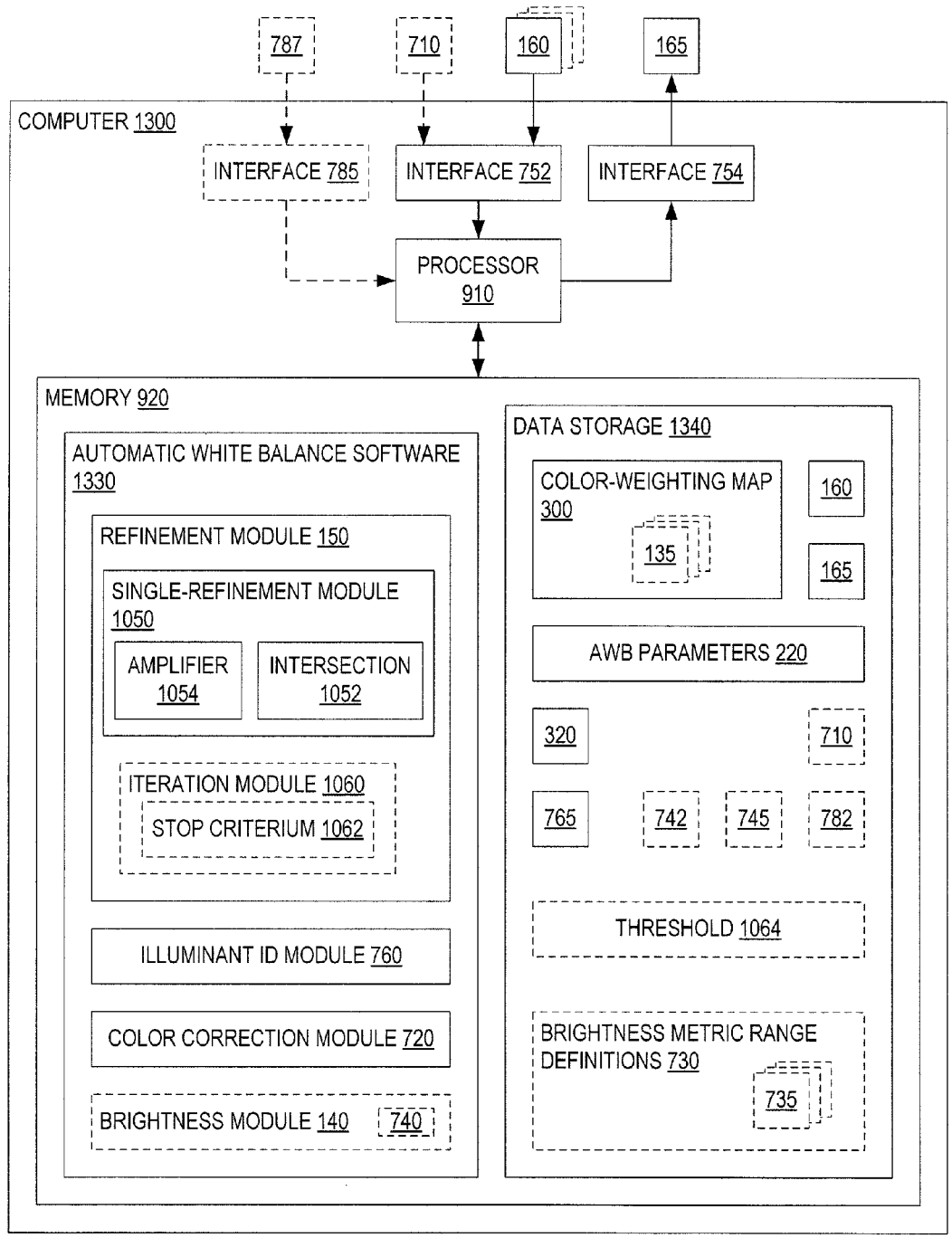
FIG. 13 illustrates a computer that implements the AWB system of FIG. 10, according to an embodiment.

FIG. 13 illustrates one exemplary computer 1300 that implements AWB system 1000 (FIG. 10). Computer 1300 is similar to computer 900 (FIG. 9), except that AWB software 930 and data storage 940 are replaced by AWB software 1330 and data storage 1340.

AWB software 1330 is similar to AWB software 930, except that (a) brightness module 140 is optional, (b) illuminant identification module 760 is required, and (c) AWB software 930 further implements refinement module 150 with single-refinement module and, optionally, iteration module 1060.

Data storage 1340 is similar to data storage 940, except that (a) color-weighting map 130 is implemented as color-weighting map 300, (b) brightness-specific color-weighting maps 135 are optional, (c) brightness metric 742 is optional, (d) brightness identifier 745 is optional, (e) brightness metric range definitions 730 is optional, (f) illuminant identifier 765 is required, and (g) data storage 1340 further includes storage for illuminant-specific probability distribution 320 and, optionally, threshold 1064.

Figure 14:
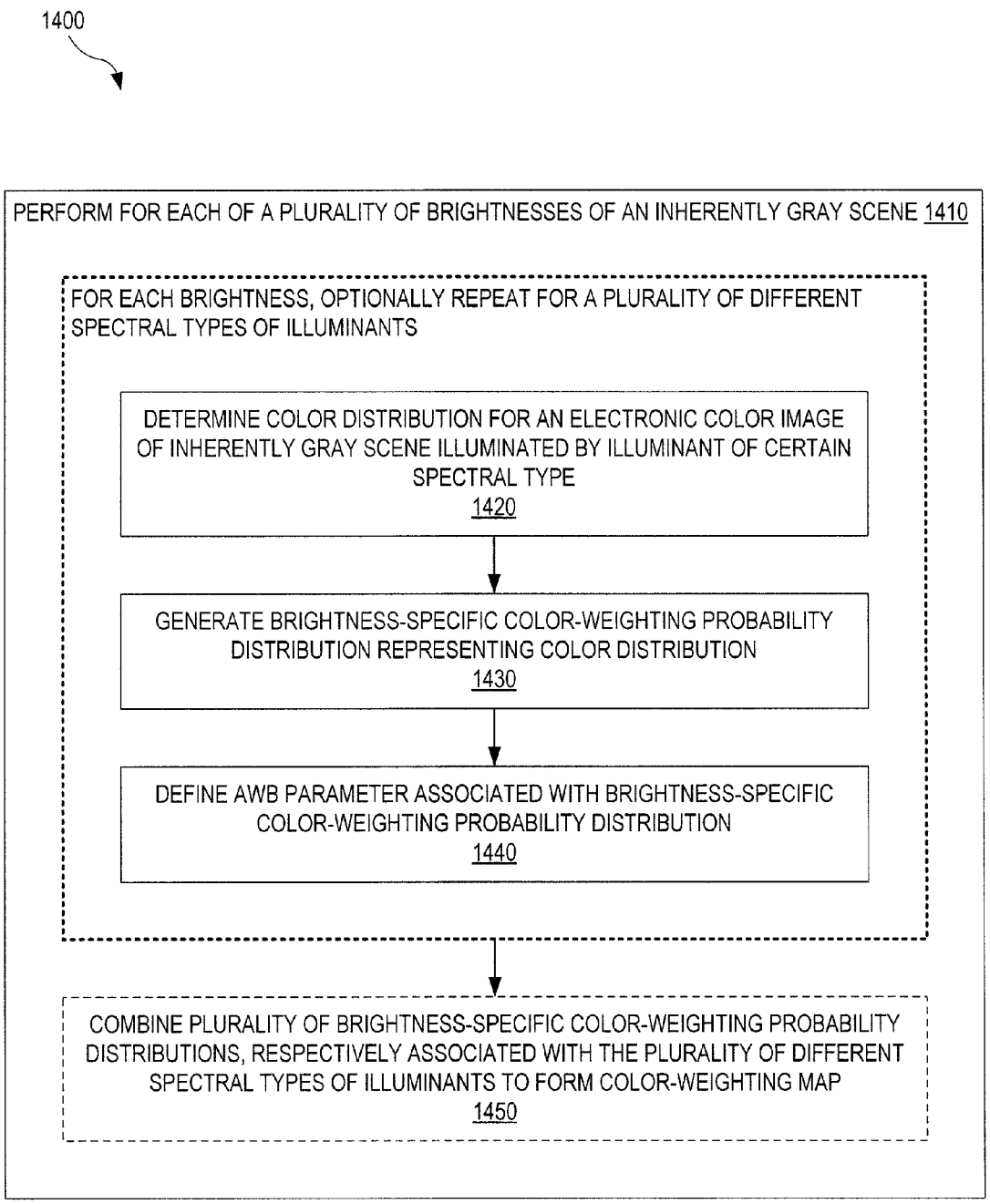
FIG. 14 illustrates a method for generating brightness-specific auto white balance parameters, according to an embodiment.

FIG. 14 illustrates one exemplary method 1400 for generating brightness-specific auto white balance parameters, such as brightness-specific embodiments of AWB parameters 220 (FIG. 2), for electronic color camera 110 (FIG. 1).

Method 1400 repeats a step 1410 for a plurality of different brightnesses of an inherently gray scene. The inherently gray scene is, for example, a gray card. Step 1410 includes steps 1420, 1430, and 1440, and optionally a step 1450.

Step 1420 determines a color distribution for an electronic color image, captured by electronic color camera 110, of an inherently gray scene illuminated by an illuminant of a certain spectral type. The illuminant is, for example, one of illuminants C, T, D, A, and H discussed in reference to FIG. 2. In one example of step 1420, the color distribution indicates the distribution, over all pixels of the electronic color image, of the intensity of primary colors of the electronic color image, such as R, G, and B.

Step 1430 processes the color distribution of step 1420 to determine illuminant-specific probability distribution 320 (FIG. 3) for the illuminant under consideration.

Step 1440 defines AWB parameter 220 associated with illuminant-specific probability distribution 320. In one example, step 1440 defines AWB parameter 220 as the ordered pair [color ratio X, color ratio Y] of a global maximum of illuminant-specific probability distribution 320.

In an embodiment, method 1400 repeats steps 1420, 1430, and 1440 for a plurality of different illuminants, such as illuminants C, T, D, A, and H discussed in reference to FIG. 2, to produce a plurality of illuminant-specific probability distributions 320 such as illuminant-specific probability distributions 320(1), 320(2), 320(3), and 320(5). In this embodiment, step 1410 may include a step 1450, wherein the plurality of illuminant-specific probability distributions 320 are combined to form a brightness-specific embodiment of color-weighting map 300. In one example, method 1400 repeats step 1410 for three different scene brightnesses, low, moderate, and high, to produce brightness-specific color-weighting maps 401, 402, and 403 (FIG. 4), respectively.

Combinations of Features

Features described above as well as those claimed below may be combined in various ways without departing from the scope hereof. For example, it will be appreciated that aspects of one AWB method or system described herein may incorporate or swap features of another AWB method or system described herein. The following examples illustrate some possible, non-limiting combinations of embodiments described above. It should be clear that many other changes and modifications may be made to the methods and device herein without departing from the spirit and scope of this invention:

(A1) A brightness-sensitive AWB method may include (a) determining brightness of a scene captured in an electronic color image and (b) selecting a color-weighting map based upon the brightness of the scene.

(A2) The AWB method denoted as (A1) may further include (c) extracting auto white balance parameters from the color-weighting map and (d) correcting color of the electronic color image, according to the auto white balance parameters, to generate a white balanced image.

(A3) In each of the AWB methods denoted as (A1) and (A2) of claim 1, the step of selecting may include selecting the color-weighting map from a plurality of brightness-specific color-weighting maps respectively associated with different values of the brightness of the scene.

(A4) In each of the AWB method denoted as (A1) through (A3), the step of determining brightness may include calculating, based upon the electronic color image and camera settings associated with capture of the electronic color image, a brightness metric for the electronic color image.

(A5) In the AWB method denoted as (A4), the step of calculating the brightness metric may include calculating a brightness metric that is proportional to $T_{exp}*g_e/B_{mean}$, wherein $T_{exp}$ is exposure time associated with the electronic color image, $g_e$ is electronic gain associated with the electronic color image, and $B_{mean}$ is mean brightness of the electronic color image.

(A6) In each of the AWB methods denoted as (A1) through (A3), the step of determining brightness may include measuring the brightness of the scene using a light meter.

(A7) In the AWB method denoted as (A6), the step of determining brightness may further include determining a brightness metric based upon the brightness measurement by the light meter.

(A8) In each of the AWB methods denoted as (A4) through (A7), the step of selecting may include selecting the color-weighting map from a plurality of brightness-specific color-weighting maps respectively associated with different ranges of the brightness metric.

(A9) In the AWB method denoted as (A8), the plurality of brightness-specific color-weighting maps may including (i) a low-brightness color-weighting map associated with the brightness metric being less than a first threshold, (ii) a moderate-brightness color-weighting map associated with the brightness metric being between the first threshold and a second threshold that is greater than the first threshold, and (iii) a high-brightness color-weighting map associated with the brightness metric being greater than the second threshold.

(A10) In each of the AWB methods denoted as (A1) through (A9), the color-weighting map may be a probability distribution of an ordered pair of color ratios, wherein the ordered pair of color ratios defines the auto white balance parameters.

(A11) In the AWB method denoted as (A10), the probability distribution may be composed of a plurality of illuminant-specific probability distributions, each associated with a different spectral type of illuminant.

(A12) In the AWB method (A11), each of the plurality of illuminant-specific probability distributions may have less spread in a brightness-specific color-weighting map associated with a higher value of the brightness of the scene than in a brightness-specific color-weighting map associated with a lower value of the brightness of the scene.

(A13) Each of the AWB methods denoted as (A1) through (A12) may further include refining a predetermined brightness-specific color-weighting map based upon the electronic color image to determine the color-weighting map.

(A14) In the AWB method denoted as (A13), the color-weighting map may be a probability distribution of an ordered pair of color ratios, wherein the ordered pair of color ratios defines the auto white balance parameters.

(A15) In the AWB method denoted as (A14), the probability distribution may be composed of a plurality of illuminant-specific probability distributions each associated with a different spectral type of illuminant.

(A16) In the AWB method denoted as (A15), the step of refining may include (a) determining, for the captured image, a current distribution of the ordered pair of color ratios, the current distribution being specific to current spectral type of scene illuminant, (b) determining intersection between the current distribution and a selected one of the plurality of illuminant-specific probability distributions, (c) replacing, in the probability distribution, the selected one of the plurality of illuminant-specific probability distributions with the intersection, to generate a refined illuminant-specific probability distribution; and (d) populating the color-weighting map with the refined probability distribution.

(A17) The AWB method denoted as (A16) may further include amplifying a portion of the color-weighting map associated with peak of the current distribution.

(A18) Each of the AWB methods denoted as (A13) through (A17) may include iteratively repeating the step of refining for a plurality of electronic color images to determine the color-weighting map.

(A19) Each of the AWB methods denoted as (A1) through (A18) may be implemented in the electronic camera used to capture the electronic color image.

(B1) A method for generating brightness-specific auto white balance parameters for an electronic color camera may include, for each of a plurality of brightnesses of an inherently gray scene, (a) determining color distribution for an electronic color image, captured by the electronic color camera, of the inherently gray scene illuminated by an illuminant of a specific spectral type, and (b) generating a brightness-specific color-weighting probability distribution representing the color distribution.

(B2) The method denoted as (B1) may further include, for each of the plurality of brightnesses, (a) performing the steps of determining and generating for a plurality of illuminants of a respective plurality of different spectral types to generate a respective plurality of brightness-specific color-weighting probability distributions, (b) and combining the plurality of brightness-specific color-weighting probability distributions to generate a brightness-specific color-weighting map applicable to all of the plurality of illuminants.

(B3) The method denoted as (B2) may further include, for each of the plurality of brightnesses, storing to non-transitory machine-readable memory of the electronic color camera (i) the brightness-specific color-weighting map and (ii) a brightness range definition defining applicability range of the brightness-specific color-weighting map.

(B4) Each of the AWB methods denoted as (A1) through (A19) may utilize the brightness-specific color-weighting maps generated by either of the methods denoted as (B2) and (B3).

(C1) A system for brightness-sensitive automatic white balancing of an electronic color image captured by an electronic camera may include a processor and a memory having (a) a plurality of brightness-specific color-weighting maps each specifying illuminant-specific auto white balance parameters, (b) a plurality of brightness range definitions respectively indicating applicability range of the plurality of brightness-specific color-weighting maps, and (c) machine-readable white balance instructions, encoded in a non-transitory portion of the memory, that, upon execution by the processor, white balances the electronic color image, wherein the white balance instructions include brightness instructions that, upon execution by the processor, determine brightness of a scene represented by the electronic color image and select one of the plurality of brightness-specific color-weighting maps based upon the plurality of brightness range definitions.

(C2) In the system denoted as (C1), the white balance instructions may further include color correction instructions that, upon execution by the processor, (i) determine type of illuminant associated with the electronic color image, (ii) extract auto white balance parameters, specific to the type of illuminant, from one of the plurality of brightness-specific color-weighting maps, and (iii) apply the auto white balance parameters to the electronic color image to generate a white balanced color image.

(C3) In each of the systems denoted as (C1) and (C2), the brightness instructions may include a brightness metric calculator that, upon execution by the processor, calculates a brightness metric for the electronic color image.

(C4) In the system denoted as (C3), the memory may further include a brightness parameter storage for storage by the processor of (i) exposure time $T_{exp}$ associated with the electronic color image, (ii) electronic gain $g_e$ associated with the electronic color image, and (iii) mean brightness $B_{mean}$ of the electronic color image.

(C5) In the system denoted as (C4), the brightness metric calculator may calculate the brightness metric as a parameter proportional to $T_{exp}*g_e/B_{mean}$.

(C6) Each of the systems denoted as (C1) and (C2) may further include an interface, communicatively coupled with (a) the processor and (b) a light meter, for receiving from the light meter a measurement of the brightness of the scene.

(C7) In the system denoted as (C6), the brightness instructions may include instructions that, upon execution by the processor, determine the brightness of the scene from the measurement.

(C8) In the system denoted as (C7), the brightness instructions may further include instructions that, upon execution by the processor, determine a brightness metric based upon the measurement.

(C9) In each of the systems denoted as (C3) through (C8), the plurality of brightness-specific color-weighting maps may include (i) a low-brightness color-weighting map associated with the brightness metric being less than a first threshold, (ii) a moderate-brightness color-weighting map associated with the brightness metric being between the first threshold and a second threshold that is greater than the first threshold, and (iii) a high-brightness color-weighting map associated with the brightness metric being greater than the second threshold.

(C10) In each of the systems denoted as (C1) through (C10), each of the plurality of brightness-specific color-weighting maps may be a probability distribution of an ordered pair of color ratios, wherein the ordered pair of color ratios defines the auto white balance parameters.

(C11) In the system denoted as (C10), the probability distribution may be composed of a plurality of illuminant-specific probability distributions each associated with a different spectral type of illuminant.

(C12) In the system denoted as (C11), the white balance instructions may further include illuminant identification instruction that, upon execution by the processor, (a) identify one of the plurality of illuminant-specific probability distributions as corresponding to illuminant illuminating scene represented by the electronic color image and (b) determine the auto white balance parameters from the one of the plurality of illuminant-specific probability distributions.

(C13) Each of systems denoted as (C1) through (C12) may further include color-weighting map refinement instructions encoded in a non-transitory portion of the memory, wherein the refinement instructions, upon execution by the processor, process one or more electronic color images captured by the electronic camera to refine at least one of the plurality of brightness-specific color-weighting maps.

(C14) Each of the systems denoted as (C1) through (C13) may be implemented in the electronic camera.

(C15) In each of the systems denoted as (C1) through (C14), the plurality of brightness-specific color-weighting maps may be generated according to either of the methods denoted as (B2) and (B3).

(D1) An adaptive AWB method may include refining, based upon a first electronic color image of a scene illuminated by an illuminant of a first spectral type, a color-weighting probability distribution for the illuminant of the first spectral type.

(D2) The adaptive AWB method denoted as (D1) may further include, after the step of refining, (b) extracting auto white balance parameters from the color-weighting probability distribution, and (c) correcting, according to the auto white balance parameters, color of a second electronic color image of a scene illuminated by the illuminant of the first spectral type to generate a white balanced image.

(D3) In the adaptive AWB method denoted as (D2), the second electronic color image may be the first electronic color image.

(D4) Each of the adaptive AWB method denoted as (D1) through (D3) may include iteratively repeating the step of refining for a plurality of first electronic color images of one or more scenes illuminated by an illuminant of the first spectral type.

(D5) In each of the adaptive AWB methods denoted as (D1) through (D4), the color-weighting probability distribution may be a probability distribution of an ordered pair of color ratios, wherein the ordered pair of color ratios defines the auto white balance parameters.

(D6) In the adaptive AWB method denoted as (D5), the step of refining may include (a) determining, for the first electronic color image, a first distribution of the ordered pair of color ratios, (b) determining intersection between the first distribution and the color-weighting probability distribution, and (c) replacing the color-weighting probability distribution with the intersection.

(D7) In the adaptive AWB method denoted as (D6), the step of refining may further include, after one or more iterations of the steps of extracting, determining, and replacing, amplifying portion of the color-weighting probability distribution associated with peak of the first distribution.

(D8) Each of the adaptive AWB methods denoted as (D6) and (D7) may include (a) performing iterations of the steps of extracting, determining, and replacing, and (b) stopping the iterations when difference between the color-weighting probability distribution produced by current iteration and the color-weighting probability distribution produced by most recent previous iteration is below a specified threshold.

(D9) Each of the adaptive AWB methods denoted as (D1) through (D8) may include repeating the step of refining for a plurality of different spectral types of illuminants to generate a refined color-weighting map applicable to the step of applying for scenes illuminated by any one of the different spectral types of illuminants.

(D10) Each of the adaptive AWB methods denoted as (D 1) through (D8) may include repeating the step of refining for a plurality of different spectral types of illuminants, and a plurality of different scene brightness ranges associated with each of the different spectral types of illuminants, to generate a plurality of refined brightness-specific color-weighting maps, each refined brightness-specific color weighting map applicable to scenes of a specific brightness and illuminated by any one of the different spectral types of illuminants.

(D11) Each of the adaptive AWB methods denoted as (D1) through (D10) may be implemented in an electronic camera.

(E1) A system for adaptive automatic white balancing of an electronic color image captured by an electronic camera may include a processor and a memory having (a) a color-weighting map specifying a probability distribution of an ordered pair of color ratios, wherein the ordered pair of color ratios defines auto white balance parameters, and wherein the probability distribution is composed of a plurality of illuminant-specific probability distributions respectively associated with a plurality of different spectral types of illuminant, and (b) machine-readable white balance instructions, encoded in a non-transitory portion of the memory, wherein the white balance instructions include refinement instructions that, upon execution by the processor, process one or more electronic color images captured by the electronic camera to refine at least one of the plurality of illuminant-specific probability distributions.

(E2) In the system denoted as (E1), the machine-readable white balance instructions may include iteration instructions that, upon execution by the processor, iteratively execute at least a portion of the refinement instructions to iteratively refine the at least one of the plurality of illuminant-specific probability distributions based upon a plurality of electronic color images.

(E3) In the system denoted as (E2), the iteration instructions may include instructions to stop iterations when difference between the illuminant-specific probability distribution produced by current iteration and the illuminant-specific probability distribution produced by most recent previous iteration is below a specified threshold.

(E4) In each of the systems denoted as (E1) through (E3), the refinement instructions may include instructions that, upon execution by the processor, perform the steps of (i) extracting, from a first electronic color image captured by the electronic camera, a first distribution of the ordered pair of color ratios, (ii) determining intersection between the first distribution and a selected one of the plurality of illuminant-specific probability distributions associated with illumination properties most similar to illumination properties associated with the first distribution, and (iii) replacing, in the color-weighting map, the selected one of the plurality of illuminant-specific probability distributions with the intersection, to refine the selected one of the plurality of illuminant-specific probability distributions.

(E5) In the system denoted as (E4), the refinement instructions may further include amplification instructions that, upon execution by the processor, after one or more iterations of the steps of extracting, determining, and replacing, amplify portion of the selected one of the plurality of illuminant-specific probability distributions at peak of the first distribution.

(E6) In each of the systems denoted as (E1) through (E5), the color-weighting map may define a plurality of brightness-specific color-weighting maps respectively associated with a plurality of scene brightnesses for the electronic color image.

(E7) In the system denoted as (E6), the white balance instructions may further include brightness-sensitive instructions that, upon execution by the processor, (i) determine brightness of a scene captured by the electronic camera in a first electronic color image and (ii) execute the refinement instructions comprising instructions to refine an illuminant-specific probability distribution of a corresponding one of the plurality of brightness-specific color-weighting maps.

(E8) In each of the systems denoted as (E6) and (E7), the plurality of brightness-specific color-weighting maps may be generated according to either of the methods denoted as (B2) and (B3).

(E9) Each of the systems denoted as (E1) through (E7) may be implemented in the electronic camera.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present system and method, which, as a matter of language, might be said to fall therebetween.

What is claimed is:

1. A brightness-sensitive automatic white balance method, comprising:
    determining brightness of a scene captured in an electronic color image, the step of determining brightness comprising calculating a brightness metric for the electronic color image;
    selecting a color-weighting map based upon the brightness of the scene, the step of selecting comprising selecting the color-weighting map from a plurality of brightness-specific color-weighting maps respectively associated with different ranges of the brightness metric;
    extracting auto white balance parameters from the color-weighting map; and
    correcting color of the electronic color image, according to the auto white balance parameters, to generate a white balanced image;
    the plurality of brightness-specific color-weighting maps including:
    a low-brightness color-weighting map associated with the brightness metric being less than a first threshold,
    a moderate-brightness color-weighting map associated with the brightness metric being between the first threshold and a second threshold that is greater than the first threshold, and
    a high-brightness color-weighting map associated with the brightness metric being greater than the second threshold.

2. The automatic white balance method of claim 1, the step of selecting further comprising selecting the color-weighting map from a plurality of brightness-specific color-weighting maps respectively associated with different values of the brightness of the scene.

3. The automatic white balance method of claim 1, the step of determining brightness comprising calculating the brightness metric based upon the electronic color image and camera settings associated with capture of the electronic color image, a brightness metric for the electronic color image.

4. The automatic white balance method of claim 3, the step of calculating the brightness metric comprising calculating a brightness metric that is proportional to Texp*ge/Bmean, wherein Texp is exposure time associated with the electronic color image, ge is electronic gain associated with the electronic color image, and Bmean is mean brightness of the electronic color image.

5. The automatic white balance method of claim 1, the step of determining brightness comprising measuring the brightness of the scene using a light meter.

6. The automatic white balance method of claim 1, the color-weighting map being a probability distribution of an ordered pair of color ratios, the ordered pair of color ratios defining the auto white balance parameters, the probability distribution composed of a plurality of illuminant-specific probability distributions each associated with a different spectral type of illuminant.

7. The automatic white balance method of claim 6, each of the plurality of illuminant-specific probability distributions having less spread in a brightness-specific color-weighting map associated with a higher value of the brightness of the scene than in a brightness-specific color-weighting map associated with a lower value of the brightness of the scene.

8. The automatic white balance method of claim 1, further comprising refining a predetermined brightness-specific color-weighting map based upon the electronic color image to determine the color-weighting map.

9. The automatic white balance method of claim 8, the color-weighting map being a probability distribution of an ordered pair of color ratios, the ordered pair of color ratios defining the auto white balance parameters, the probability distribution composed of a plurality of illuminant-specific probability distributions each associated with a different spectral type of illuminant, the step of refining comprising:
    determining, for the captured image, a current distribution of the ordered pair of color ratios, the current distribution being specific to current spectral type of scene illuminant;
    determining intersection between (a) the current distribution and (b) a selected one of the plurality of illuminant-specific probability distributions;
    replacing, in the probability distribution, (a) the selected one of the plurality of illuminant-specific probability distributions with (b) the intersection, to generate a refined illuminant-specific probability distribution; and
    populating the color-weighting map with the refined probability distribution.

10. The automatic white balance method of claim 9, further comprising amplifying portion of the color-weighting map associated with peak of the current distribution.

11. The automatic white balance method of claim 9, comprising iteratively repeating the step of refining for a plurality of electronic color images to determine the color-weighting map.

12. An adaptive automatic white balance method, comprising:
    refining, based upon a first electronic color image of a scene illuminated by an illuminant of a first spectral type, a color-weighting probability distribution for the illuminant of the first spectral type;
    after the step of refining, extracting auto white balance parameters from the color-weighting probability distribution; and
    correcting, according to the auto white balance parameters, color of a second electronic color image of a scene illuminated by the illuminant of the first spectral type to generate a white balanced image;

the color-weighting probability distribution being a probability distribution of an ordered pair of color ratios, the ordered pair of color ratios defining the auto white balance parameters, the step of refining comprising:

determining, for the first electronic color image, a first distribution of the ordered pair of color ratios, determining intersection between the first distribution and the color-weighting probability distribution, and replacing the color-weighting probability distribution with the intersection.

13. The adaptive automatic white balance method of claim 12, the second electronic color image being the first electronic color image.

14. The adaptive automatic white balance method of claim 12 further comprising iteratively repeating the step of refining for a plurality of first electronic color images of one or more scenes illuminated by an illuminant of the first spectral type.

15. The adaptive automatic white balance method of claim 12, the step of refining further comprising, after one or more iterations of the steps of extracting, determining, and replacing, amplifying portion of the color-weighting probability distribution associated with peak of the first distribution.

16. The adaptive automatic white balance method of claim 12, comprising:

performing iterations of the steps of extracting, determining, and replacing; and stopping the iterations when difference between the color-weighting probability distribution produced by current iteration and the color-weighting probability distribution produced by most recent previous iteration is below a specified threshold.

17. The adaptive automatic white balance method of claim 12, comprising repeating the step of refining for a plurality of different spectral types of illuminants to generate a refined color-weighting map applicable to the step of applying for scenes illuminated by any one of the different spectral types of illuminants.

18. The adaptive automatic white balance method of claim 12, comprising repeating the step of refining for a plurality of different spectral types of illuminants, and a plurality of different scene brightness ranges associated with each of the different spectral types of illuminants, to generate a plurality of refined brightness-specific color-weighting maps, each refined brightness-specific color weighting map applicable to scenes of a specific brightness and illuminated by any one of the different spectral types of illuminants.

* * * * *